US008766642B2

(12) United States Patent
Bogdan, Jr. et al.

(10) Patent No.: US 8,766,642 B2
(45) Date of Patent: Jul. 1, 2014

(54) ELECTROCHEMICAL CELL

(75) Inventors: David Charles Bogdan, Jr., Scotia, NY (US); Charles Dominic Iacovangelo, Saratoga Springs, NY (US); Michael Alan Vallance, Loudonville, NY (US)

(73) Assignee: General Electric Company, Niskayuna, NY (US)

( * ) Notice: Subject to any disclaimer, the term of this patent is extended or adjusted under 35 U.S.C. 154(b) by 1308 days.

(21) Appl. No.: 12/549,839

(22) Filed: Aug. 28, 2009

(65) Prior Publication Data

US 2011/0050235 A1    Mar. 3, 2011

(51) Int. Cl.
*G01N 27/416* (2006.01)
*H01M 10/00* (2006.01)

(52) U.S. Cl.
USPC ............................ 324/426; 429/122; 29/623.1

(58) Field of Classification Search
None
See application file for complete search history.

(56) References Cited

U.S. PATENT DOCUMENTS

| | | | |
|---|---|---|---|
| 4,814,062 A | 3/1989 | Redey et al. | |
| 5,381,096 A * | 1/1995 | Hirzel | 324/427 |
| 5,496,658 A | 3/1996 | Hein et al. | |
| 5,640,150 A | 6/1997 | Atwater | |
| 6,127,806 A | 10/2000 | Tanjo et al. | |
| 2008/0145749 A1* | 6/2008 | Iacovangelo et al. | 429/130 |
| 2008/0158778 A1* | 7/2008 | Lipka et al. | 361/502 |

FOREIGN PATENT DOCUMENTS

| | | | |
|---|---|---|---|
| DE | 2622245 | * | 12/1977 |
| DE | 2622245 A1 | | 12/1977 |
| JP | 2001-176544 | * | 6/2001 |
| JP | 2001176544 | | 6/2001 |
| JP | 10111273 | | 4/2010 |

OTHER PUBLICATIONS http://www.voxsolaris.com/batnas.html.*
PCT/US2010/039122 Search Report and Written Opinion Aug. 22, 2010.
JP2001176544 Abstract, Jun. 29, 2001.
JP1011273 Abstract, Apr. 28, 1998.
Kristiane Kronsbein; Thesis : Investigation and Modelling of the ZEBRA System to Optimise State of Charge Detection; Date : May 2004; 151 Pages.

* cited by examiner

*Primary Examiner* — Patrick Ryan
*Assistant Examiner* — Christopher Domone
(74) *Attorney, Agent, or Firm* — Francis T. Coppa

(57) ABSTRACT

An electrochemical cell is provided. The electrochemical cell comprises a cathode compartment, wherein a metal in a solid form is disposed in the cathode compartment. The electrochemical cell further comprises a separator, an anode compartment, and at least one contact device disposed in the cathode compartment or in the anode compartment. The contact device is suspended from the top of the electrochemical cell in the cathode compartment or in the anode compartment. The electrochemical cell is in a ground state. An electrochemical cell during its working is also provided. Methods for using and manufacturing the electrochemical cell are also provided. The electrochemical cell is used to determine a state-of-charge of a source.

27 Claims, 11 Drawing Sheets

ELECTROCHEMICAL CELL

BACKGROUND

1. Technical Field

The invention includes embodiments that relate to an electrochemical cell. The invention includes embodiments that relate to a high-temperature rechargeable electrochemical cell. The invention includes embodiments that relate to a method for detecting a state-of-charge of the high-temperature rechargeable electrochemical cell.

2. Discussion of Related Art

There have been numerous attempts in the past to provide state-of-charge (SoC) or battery condition indicators, which allow users to readily determine the SoC of storage batteries, particularly those used in automobiles. These attempts have ranged from the extremely simple to very sophisticated. Commercial battery products that track SoC typically use a shunt to measure the current being passed and integrate this current over time to track the SoC of connected cells. While over short periods of time these measurements may be quite accurate but over very long periods of time there can be a drift due to the finite error of the electrical components such as the shunt, voltage recording, and integration of the signal over time. Further these measurements are made on the assumption that all cells have received an amount of current and that all the current received is used for the expected reactions in the cell, in other words these measurements assume that the cells exhibit 100 percent coulombic efficiency. However, this is not true for most batteries. The other issue with all other batteries is self discharge which is uncontrolled and different for each cell which makes the use of the current counting type SoC indicator unreliable for cell to cell variation.

Tracking the SoC is usually included in a battery management interface (BMI). The BMI functions as an onboard safety device, limiting the minimum and maximum voltages, temperatures, and SoC that the battery is subject to throughout its life. The BMI also may include a counter circuit for counting the number of charge/discharge cycles producing a count representative of the amount of energy dissipated and therefore indirectly of the amount of energy remaining in the battery system. However while BMI can track the SoC of electrochemical cells, the circuitry may have some finite error. This SoC sensor may not provide a means for tracking capability over long periods of time, which will allow much more accurate control of the SoC of the cells being used. If the SoC is not accurately controlled the cell life may be reduced, as over-charging or over-discharging can lead to premature cell failure. Even if the error is very small, over long periods of time the error can become significant, and the actual SoC of the cells may become very different from the recorded SoC. Further the BMI may not provide continuous internal means of determining capacity and may not be capable of providing an indication once full battery capacity is restored.

It is well documented and accepted that the available energy in a battery is a function of the conditions to which the battery has been subjected. Capacity remaining is a complex function of current drain, temperature and time. Therefore there remains a need, however, for a low cost, reliable, accurate, continuous, automatic-reset SoC indicator which is both easy to use and easy to manufacture.

BRIEF DESCRIPTION

In one embodiment, an electrochemical cell is provided. The electrochemical cell comprises a cathode compartment, wherein a metal in a solid form is disposed in the cathode compartment. The electrochemical cell further comprises a separator, an anode compartment, and at least one contact device disposed in the cathode compartment or in the anode compartment. The contact device is suspended from the top of the electrochemical cell in the cathode compartment or in the anode compartment. The electrochemical cell is in a ground state.

In another embodiment, an electrochemical cell is provided. The electrochemical cell comprises a cathode compartment, wherein a metal is disposed in the cathode compartment in a solid form in a ground state of the electrochemical cell, and wherein the metal is in a molten state during working of the cell. The electrochemical cell further comprises a separator and an anode compartment, wherein the anode compartment is empty in the ground state of the electrochemical cell and is filled with metal from reduced metal ions that move from the cathode compartment to the anode compartment through the separator during the working of the cell. At least one contact device is disposed in the cathode compartment or in the anode compartment, wherein the contact device is suspended from the top of the electrochemical cell in the cathode compartment or in the anode compartment, and wherein the contact device detects the level of the metal in its molten state in the cathode compartment or in the anode compartment during the working of the cell.

In still another embodiment, an electrochemical cell is provided. The electrochemical cell comprises, a cathode compartment, wherein a metal is disposed in the cathode compartment in a solid form in a ground state of the electrochemical cell, and wherein the metal is in a molten state during working of the cell. The electrochemical cell further comprises a separator and an anode compartment, wherein the anode compartment is empty in the ground state of the electrochemical cell and is filled with metal from reduced metal ions that move from the cathode compartment to the anode compartment through the separator during the working of the cell. At least one contact device is disposed in the cathode compartment or in the anode compartment, wherein the contact device is suspended from the top of the electrochemical cell in the cathode compartment, and wherein the contact device detects the level of the metal in its molten state in the cathode compartment or in the anode compartment during the working of the cell. A cathode current collector is in contact with the cathode compartment and an anode current collector is in contact with the anode compartment. The electrochemical cell further comprises a source for applying a potential across the cathode current collector and the anode current collector of the electrochemical cell.

In yet still another embodiment, a method of determining the state-of-charge of a source is provided. The method comprises connecting the source in series with a cathode current collector and an anode current collector of an electrochemical cell. The electrochemical cell comprises a cathode compartment, wherein a metal is disposed in the cathode compartment in a solid form in a ground state of the electrochemical cell, and wherein the metal is in a molten state during working of the cell. The electrochemical cell further comprises a separator and an anode compartment, wherein the anode compartment is empty in the ground state of the electrochemical cell and is filled with metal from reduced metal ions that move from the cathode compartment to the anode compartment through the separator during the working of the cell. At least one contact device is disposed in the cathode compartment or in the anode compartment, wherein the contact device is suspended from the top of the electrochemical cell in the cathode compartment or in the anode compartment, and wherein the contact device detects the level of the metal in its molten state in the cathode compartment or in the anode compartment during the working of the cell.

In still yet another embodiment, is provided a method for forming an electrochemical cell. The method comprises providing a cathode compartment, wherein a metal is disposed in the cathode compartment in a solid form in a ground state of the electrochemical cell, and wherein the metal is in a molten state during working of the cell; a separator; an anode compartment; wherein the anode compartment is empty in the ground state of the electrochemical cell and is filled with metal from reduced metal ions that move from the cathode compartment to the anode compartment through the separator during the working of the cell; and at least one contact device disposed in the cathode compartment or in the anode compartment; wherein the contact device is suspended from the top of the electrochemical cell in the cathode compartment or in the anode compartment, wherein the contact device detects the level of the metal in its molten state in the cathode compartment or in the anode compartment during the working of the cell.

DETAILED DESCRIPTION

Figure 1:
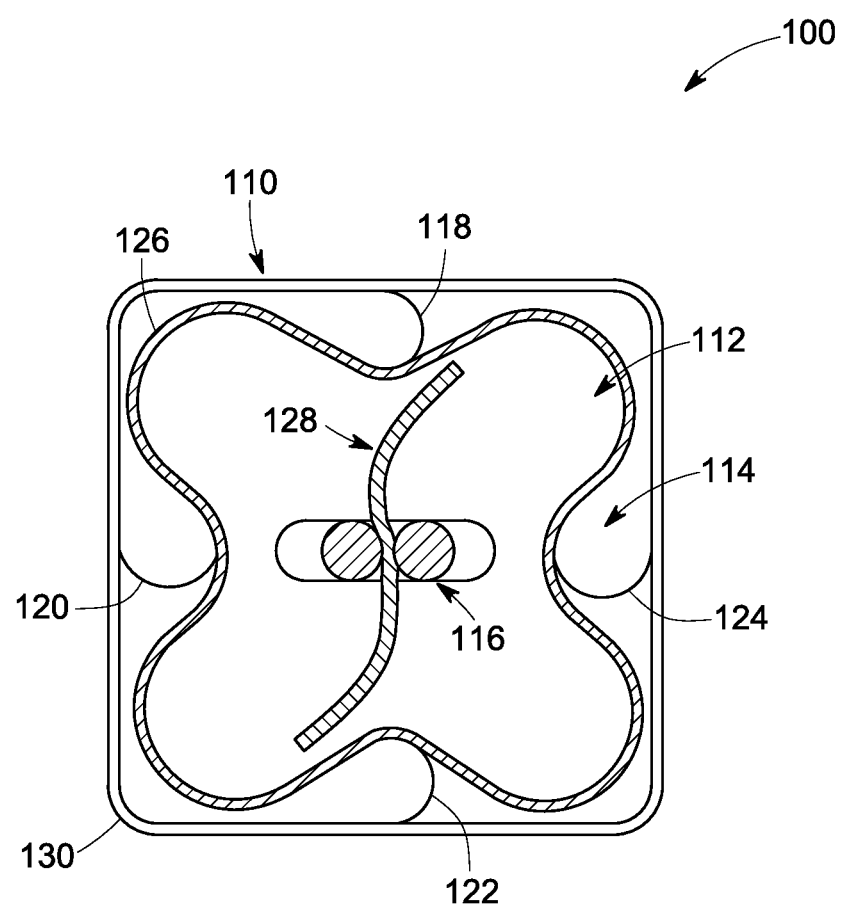
FIG. 1 is a schematic view illustrating a top cross-sectional view of a source electrochemical cell in accordance with an embodiment of the invention.

The invention includes embodiments that relate to an electrochemical cell. The invention includes embodiments that relate to a high temperature rechargeable electrochemical cell. The invention includes embodiments that relate to a method for introducing a state-of-charge detector in the electrochemical cell.

Embodiments of the invention described herein address the noted shortcomings of the state of the art. The electrochemical cell described herein fills the needs described above by determining a SoC of a source, for example, a high-temperature rechargeable electrochemical cell. The high-temperature rechargeable electrochemical cells are currently being developed for use in hybrid locomotive batteries. These batteries could potentially offer the improved energy density, power density, lifetime, and cost demanded by a locomotive application. To maximize cell lifetime, careful characterization of cell performance over time using different operating limits, namely voltage, current, and SoC limits is required. These limits are needed to prevent undesired degradation of the cells due to over-charging, discharging, or over-heating of the cells. In a battery, where many cells will likely be connected in a series, a BMI system may be responsible for maintaining these limits on the battery as a whole. While direct measurement of the battery voltage and current is relatively simple, tracking SoC over long periods of time is inherently prone to error due to the finite accuracy of the BMI electronics as discussed above. Typically, the long-term lifetime goal of a battery for a locomotive application is about 20 calendar years, and over such a long period of time even extremely small sources of error in the BMI electronics can cause significant error in the tracking of SoC. The traditional method for correcting for this error when using high-temperature rechargeable sodium-nickel chloride cells is to reset the SoC device being used, when the cells are considered fully charged. Fully charged in this case is defined as reaching a specific cell resistance. The reset method may be reliable enough for mild cycling conditions or short-term tests, but under the demanding conditions of the locomotive application, the cell resistance versus SoC can degrade considerably over time. This means that an indication of fully charged at the start of the test when the battery is new and the indication of fully charged at the end of the test when the battery has gone through various charging and discharging cycles will likely provide different SoC values. Hence a SoC device is needed that can track SoC over time with less error than the error that is possible when using electronic components. An alternative approach to tracking SoC, as disclosed herein, employs a separate electrochemical cell i.e., a SoC electrochemical cell, rather than using the electronic components of the BMI method or change in resistance of the source electrochemical cell as in the commercial methods.

Historically, a SoC tracking method has been used for high-temperature rechargeable sodium-nickel chloride cells. The method was developed for protocols using slow (i.e. 8-hour) charges. With this method, the SoC is tracked by measuring the current going in and out of the cell during cycling using a Battery Management Interface (BMI). Every time the cell is charged to a specified resistance, typically 180 milli Ohms, the cell is considered fully charged. Every time the cell is fully charged, the SoC counter in the BMI is reset. To keep the counter accurate, there is a maximum number of cycles the cell is allowed to perform without fully charging, such as 20 nameplate cycles, wherein nameplate cycle refers to the specified capacity of the battery, for example 32 Ampere-hours. In an automotive application, where the battery is frequently charged slowly to fully charged (overnight charging), this method may work reasonably well. However, even in this application there may be a risk when the cell degrades. When the cell degrades, the 180 milli Ohms resistance will be reached during charging earlier and earlier. If the same nameplate capacity is used, but the fully charged point is at a lower and lower SoC, eventually the cell may become over-discharged. The alternative would be simply tracking the SoC with the BMI hardware without the resistance-based resets, but the hardware is simply not accurate enough to track the SoC over long periods of time.

For example, for tracking SoC in a locomotive application the following factors need to be considered. A typical locomotive drive cycle does not include any slow charging, as the battery is recharged through regenerative braking. The lengths of the regenerative braking events vary widely, but in general to maximize fuel savings, the charging must be rapid. Therefore the only way to reset the SoC device in the BMI would be to intentionally perform a slow charge on the battery. This takes a significant period of valuable time, as the battery would not be in service while this is happening. If performed using the locomotive's alternator, it would also cut down on the overall fuel savings directly by consuming fuel. Overall, adding periodic slow charges would be costly for the locomotive application. Even if slow charges were incorporated into the hybrid-locomotive's operating schedule, it would not solve the problem of cell degradation. The more the cell degrades, the less charged the cell would be at "fully charged." Even in laboratory testing, tracking the SoC can be rendered unreliable. For example, even when slow charges are performed periodically, from the data collected it is not possible to tell whether the cell is getting less and less charged over time or if the SoC tracking of the testing equipment is drifting over time.

In various embodiments, the device disclosed herein is capable for being used in continuous internal monitoring, is capable of being reset, is inexpensive, simply implemented, and accurate. The device disclosed herein comprises an electrochemical cell. The electrochemical cell is at times referred to as SoC electrochemical cell. When the cell is manufactured, and is in the ground state, the electrochemical cell comprises a cathode compartment, a separator, an anode compartment, at least one contact device disposed from the top of the electrochemical cell in the cathode compartment or in the anode compartment. The cathode compartment as constructed comprises a metal in a solid form and the anode compartment is empty in the ground state. In one embodiment, the SoC electrochemical cell may be connected in series to a source electrochemical cell, so that the anode current collector of the source electrochemical cell is connected to the cathode current collector of the SoC electrochemical cell, or the cathode current collector of the source electrochemical cell is connected to the anode current collector of the SoC electrochemical cell. The SoC electrochemical cell and the source electrochemical cell series may be connected to a voltage source, so that any current that passes through the source electrochemical cell also passes through the SoC electrochemical cell. During the working of the cell i.e., during the charging, when the cell is heated the solid metal in the cathode compartment melts to form a liquid metal and then dissociates into metal cations and electrons. The metal cations pass through the separator and enter the anode compartment where they combine with electrons from the anode current collector to reform the metal atoms. During the discharging of the electrochemical cell, a reverse reaction occurs. The metal atoms formed in the anode compartment during the discharging of the cell disassociate into metal cations and electrons, the metal cations pass through the separator back into the cathode compartment, combine with the electrons supplied by the cathode current collector, to reform the metal atoms. During the charging and discharging of the cell the level of the liquid metal in the cathode compartment decreases and increases respectively and the level of the liquid metal in the anode compartment increases and decreases respectively. The SoC of the source electrochemical cell is measured based on change in the contact status of the liquid metal with the contact device as discussed in detail below.

Approximating language, as used herein throughout the specification and claims, may be applied to modify any quantitative representation that could permissibly vary without resulting in a change in the basic function to which it may be about related. Accordingly, a value modified by a term such as "about" is not limited to the precise value specified. In some instances, the approximating language may correspond to the precision of an instrument for measuring the value.

Figure 2:
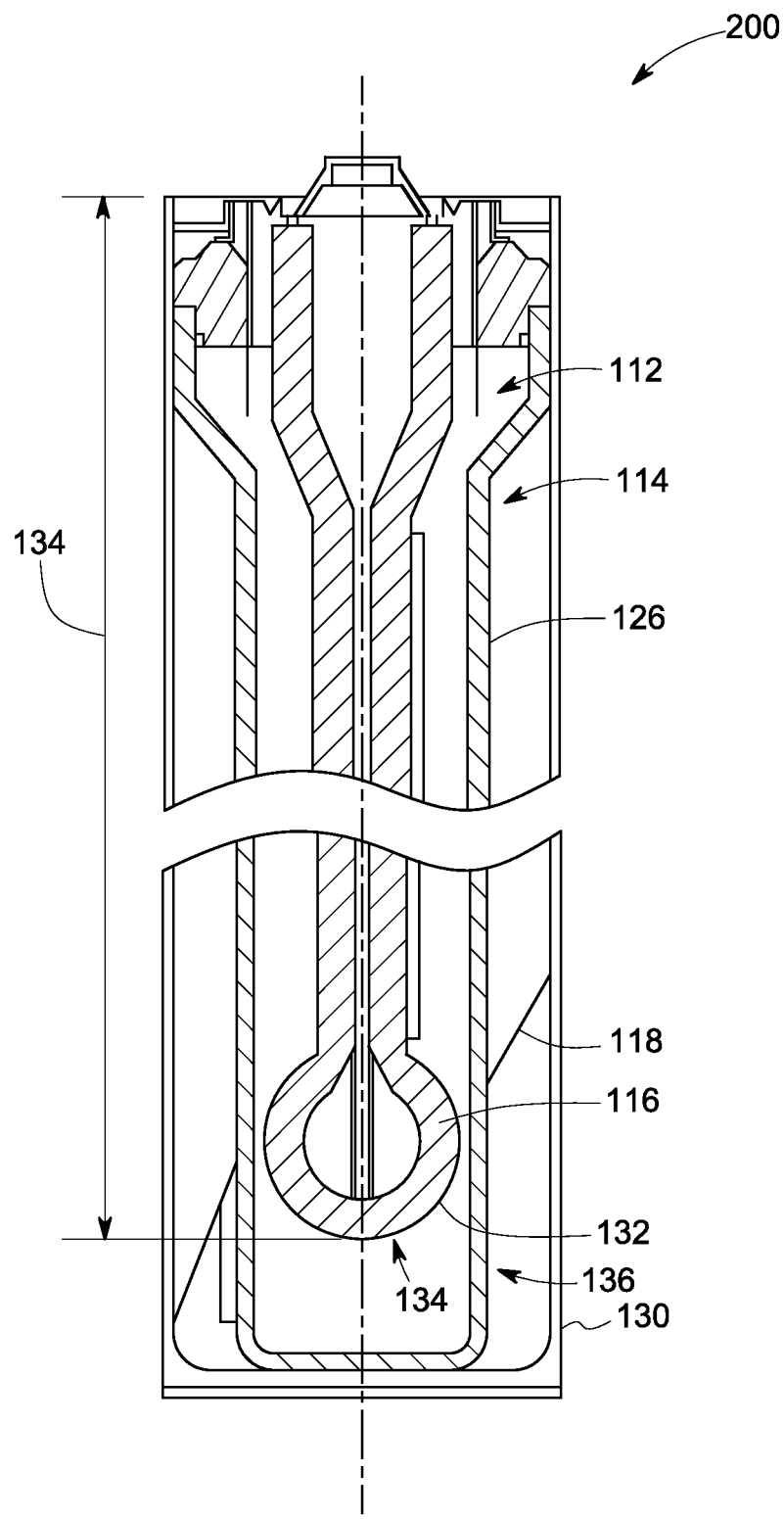
FIG. 2 is a schematic view illustrating a front cross-sectional view of a source electrochemical cell in accordance with an embodiment of the invention.

In one embodiment, the source electrochemical cell comprises a high-temperature rechargeable electrochemical cell, a potentiostat where the SoC electrochemical cell is used for calibration, or a battery management interface where the SoC electrochemical cell is used for calibration. In one embodiment, the source is a high-temperature rechargeable sodium-nickel chloride cell. Typically a high-temperature rechargeable sodium-nickel chloride cell consists of a nickel-nickel chloride cathodic material and a molten sodium anodic material, separated by a solid sodium conducting beta-alumina ceramic tube. Referring to FIG. 1 and FIG. 2, a top cross-sectional view 100 and a front cross-sectional view 200 of a source electrochemical cell 110 is provided. The source electrochemical cell 110 consists of a cathode compartment 112 comprising a cathodic material (not shown in figure), an anode compartment 114 comprising an anodic material (not shown in figure), a cathode current collector 116, four shims 118, 120, 122, and 124 a separator 126, and an electrolyte reservoir 128, for example a non woven carbon fiber wick enclosed in a casing 130. A cathode current collector 116 is connected to the cathode compartment 112. The cathode compartment 112 comprising the cathodic material (not shown in figure) is located inside the separator 126. The cathodic material mainly consists of nickel and sodium chloride, in case of a sodium-nickel chloride cell 110. In one embodiment, very fine, filamentary Inco Nickel-255 (obtained from Vale Inco) is compacted and granulated with pure, milled sodium chloride (obtained from Custom Powders Limited) for loading into the cathode compartment 112. About 50 percent of the cathodic material volume as built comprises granulated nickel and sodium chloride. The remaining portion of the cathode compartment 112 inside the separator 126 is filled with the molten salt electrolyte; sodium aluminum tetrachloride ($NaAlCl_4$) which has a melting point of approximately about 160 degrees Celsius. The working temperature of the source electrochemical cell 110, when it is a sodium-nickel chloride cell, is about 300 degrees Celsius. As mentioned above, the cathode compartment 112 includes a U-shaped cathode current collector 116. In one embodiment, the cathode current collector 116 is made of either pure nickel or nickel with a copper core, which runs down the length 130 of the source electrochemical cell 110 with a bend 132 at the bottom 134 of the source electrochemical cell 110. In one embodiment, a electrolyte reservoir, for example a non woven fiber wick such as carbon fiber felt 128 is placed between the two sides of the cathode current collector 116 to act as a reservoir for excess molten electrolyte during the volume changes that occur during the normal discharging and charging of the source electrochemical cell 110.

In one embodiment, the separator 126 is a solid ceramic tube that separates the cathode compartment 112 and the anode compartment 116, both physically and electronically. In one embodiment, the separator 126 is a sodium beta-alumina solid electrolyte, which functions as a secondary electrolyte. In one embodiment, the ceramic used for this tube, sodium-conducting beta-alumina, is a good conductor of $Na^+$ ions at the normal operating temperature for the source electrochemical cell 110 of about 300 degrees Celsius. In one embodiment, the separator 126 is shaped like a cloverleaf as shown in the top view cross-section in FIG. 1. The use of a cloverleaf provides increased surface area of the secondary electrolyte when compared to a circular tube. In certain embodiments, the outer surface 136 of the separator 126 is coated with conductive carbon paint (not shown in figure), which facilitates electrical contact to the separator 126 during the initial charge, where there is no molten anodic material, for example, sodium present at the start.

In one embodiment, the anode compartment 116 comprises an anodic material (not shown in figure). In one embodiment, the anodic material comprises molten metallic sodium when the source electrochemical cell 110 is a sodium-nickel chloride cell. The anode compartment 116 is connected to an anode current collector (negative electrode, not shown in figure). As used herein, cathodic material is the material that supplies electrons during charge and is present as part of a redox reaction. Anodic material accepts electrons during charge and is present as part of the redox reaction.

In certain embodiments, in addition to the carbon paint on the outer surface 136 of the separator 126, there are metal shims 118, 120, 122, and 124 pressing against the outer surface 136 of the separator 126, which provide electrical contact to the separator 126. The metal shims 118, 120, 122, and 124 in addition create a space for the sodium to wick and wet the entire outer surface 136 of the separator, even when the sodium level in the compartment is relatively low.

A brief description of the chemistry occurring in the cathode compartment 112 and the anode compartment 114 of the source electrochemical cell 110 is included below. The half-cell reactions in a sodium-nickel chloride cell occurring in the cathode compartment include the reactions shown in Equation 1 below.

$$Ni + 2Cl^- \leftrightarrow NiCl_2 + 2e^-$$
$$Na^+ + e^- \leftrightarrow Na \quad \text{Equation 1}$$

During charging of the source electrochemical cell 110, for example a sodium-nickel chloride cell, the cathodic material comprising of nickel and sodium chloride, present in the cathode compartment is oxidized by the addition of negative chloride ions to form nickel chloride and the sodium ions are reduced by the addition of electrons to form metallic sodium as shown in Equation 1. The reverse reactions occur during the discharging of the sodium-nickel chloride cell. In one embodiment, the reversible cell potential, $U_0$, is about 2.58 Volts under the working temperature of the sodium-nickel-chloride cell of about 300 degrees celsius. The chloride required for the oxidation reaction is supplied by the sodium chloride that is granulated with the nickel. Typically when the source electrochemical cell 110 is built it is in a completely discharged condition. To minimize or prevent over-discharge protection through the reaction, some aluminum is added to the cathode compartment 112 with the cathodic material. The aluminum reacts in a manner shown in Equation 2 to generate more metallic sodium.

$$Al + 4Cl^- \leftrightarrow AlCl_4^- + 3e^-$$
$$3Na^+ + 3e^- \leftrightarrow 3Na \quad \text{Equation 2}$$

The reaction shown in Equation 2 has a reversible potential of 1.58 Volts under the working temperature of the source electrochemical cell 110, for example a sodium-nickel chloride cell, of about 300 degrees Celsius. This initial reaction, which occurs at a lower potential of about 1 Volts than the nickel-nickel chloride reaction, generates sodium in the anode compartment. During the working of the cell, the cell may not recede to a reversible potential that is below the reversible potential of the reaction shown in Equation 2 and thus the sodium generated initially may never be depleted. In situations where the sodium in the anode compartment depletes to low levels of about 4.3 grams or about 5 Ampere hours, the surface area of the reaction shown in Equation 1 may reduce, resulting in very high current densities, and leading to cell failure. In addition to creating sodium for the anode compartment, the reaction shown in Equation 2 creates more of the molten salt ($NaAlCl_4$). The molten salt has a very low solubility for sodium chloride, and at equilibrium the composition is very close to 50:50 $NaCl:AlCl_3$. During charging, as sodium chloride is consumed, presumably from the liquid molten salt phase, solid sodium chloride dissolves to maintain equilibrium. If a region of the cathode becomes depleted of sodium chloride, the following reaction as shown in Equation 3 may occur.

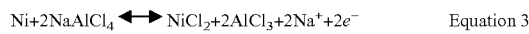

$$Ni + 2NaAlCl_4 \leftrightarrow NiCl_2 + 2AlCl_3 + 2Na^+ + 2e^- \quad \text{Equation 3}$$

The reversible potential for the reaction shown in Equation 3 is 3.05 Volts at 300 degrees Celsius. While this reaction can be avoided by limiting the charging voltage of the battery, applications that demand fast charging, such as the locomotive, may require going above this potential. When charging above this potential, it is likely that some areas of the cathode become depleted of sodium chloride. While this may be undesirable since it is a source of cell degradation, simply slowing or stopping the charging current will allow diffusion of molten sodium chloride to bring the electrolyte back to equilibrium throughout the cell. If all of the excess sodium chloride is consumed, the entire cathode will continue charging using the molten sodium aluminum tetrachloride as a chloride source, as shown in Equation 3, and the entire cathode will remain depleted until the source electrochemical cell 110 is discharged. When this occurs, the cell is considered "overcharged." In practice, the cell is generally considered "fully-charged" at some point before all of the sodium chloride is consumed.

In various embodiments, it is advantageous to have strict limits on how charged or discharged the cell gets during high rate cycling. Ideally, the reaction shown in Equation 3 could be avoided entirely to prolong cell lifetime. If avoiding the reaction shown in Equation 3 is not realistic in a demanding application, than a SoC limit could at least prevent the entire cathode from becoming depleted of sodium chloride. In addition, while the reaction in Equation 2 may generally be avoided completely through voltage control, reducing all of the nickel chloride generated by fully charging the cell may still leave the compartment low on sodium. This condition may lead to cell failure, especially in situations, where the current is quickly reversed, creating very high, localized current densities on the separator 126. Further, at high enough current densities, metallic sodium dendrites may propagate cracks in the separator, leading to cell failure. Again, as explained above, it may be advantageous to have a strict SoC limit before the point of separator cracking is reached. For example, a sodium-nickel-chloride cell would typically have a SoC limit of about 5 Ampere-hours to about 44 Ampere-hours.

In one embodiment, an electrochemical cell is provided. The electrochemical cell comprises a cathode compartment, wherein a metal in a solid form is disposed in the cathode compartment. The electrochemical cell further comprises a separator, an anode compartment, and at least one contact device disposed in the cathode compartment or in the anode compartment. The contact device is suspended from the top of the electrochemical cell in the cathode compartment or in the anode compartment. The electrochemical cell is in a ground state. As mentioned above, the electrochemical cell is a SoC electrochemical cell that is employed to determine the SoC of a source electrochemical cell.

In one embodiment, the electrochemical cell used as the SoC electrochemical cell comprises a sodium-sodium cell. The cell may comprise similar features to the sodium-nickel chloride cell described above except in the difference in the cathodic material. As used herein, the phrase "ground state" means that the electrochemical cell as built and having had no potential or voltage source applied across the cathode current collector or the anode current collector to start the reactions in the cathode compartment or the anode compartment of the cell. As discussed above, the SoC electrochemical cell may be connected in series to a source electrochemical cell, so that the anode current collector of the source electrochemical cell is connected to the cathode current collector of the SoC electrochemical cell, or the cathode current collector of the source electrochemical cell is connected to the anode current collector of the SoC electrochemical cell. The SoC electrochemical cell and source electrochemical cell series may be connected to a voltage source, so that any current that passes through the source electrochemical cell also passes through the SoC electrochemical cell. The cell as constructed in the ground state, has the metal in solid form present in the cathode compartment and has no metal present in the anode compartment. Charging of the cell during the working of the cell generates the metal in the anode compartment from reduced metal ions that move from the cathode compartment to the anode compartment through the separator. During the working of the cell, when the cell is recharged, at the end of a recharge cycle, the cell is considered to be in the ground state as there is no metal in the anode compartment and there is molten metal in the cathode compartment. This may also be considered as the intermittent ground state that the cell returns to during the working of the cell. In another embodiment, if the SoC electrochemical cell is heated to a particular temperature before applying a potential across the cathode current collector or the anode current collector, the solid metal in the cathode compartment melts, and we have a SoC electrochemical cell in the ground state with molten metal in the cathode compartment and an empty anode compartment.

Figure 3:
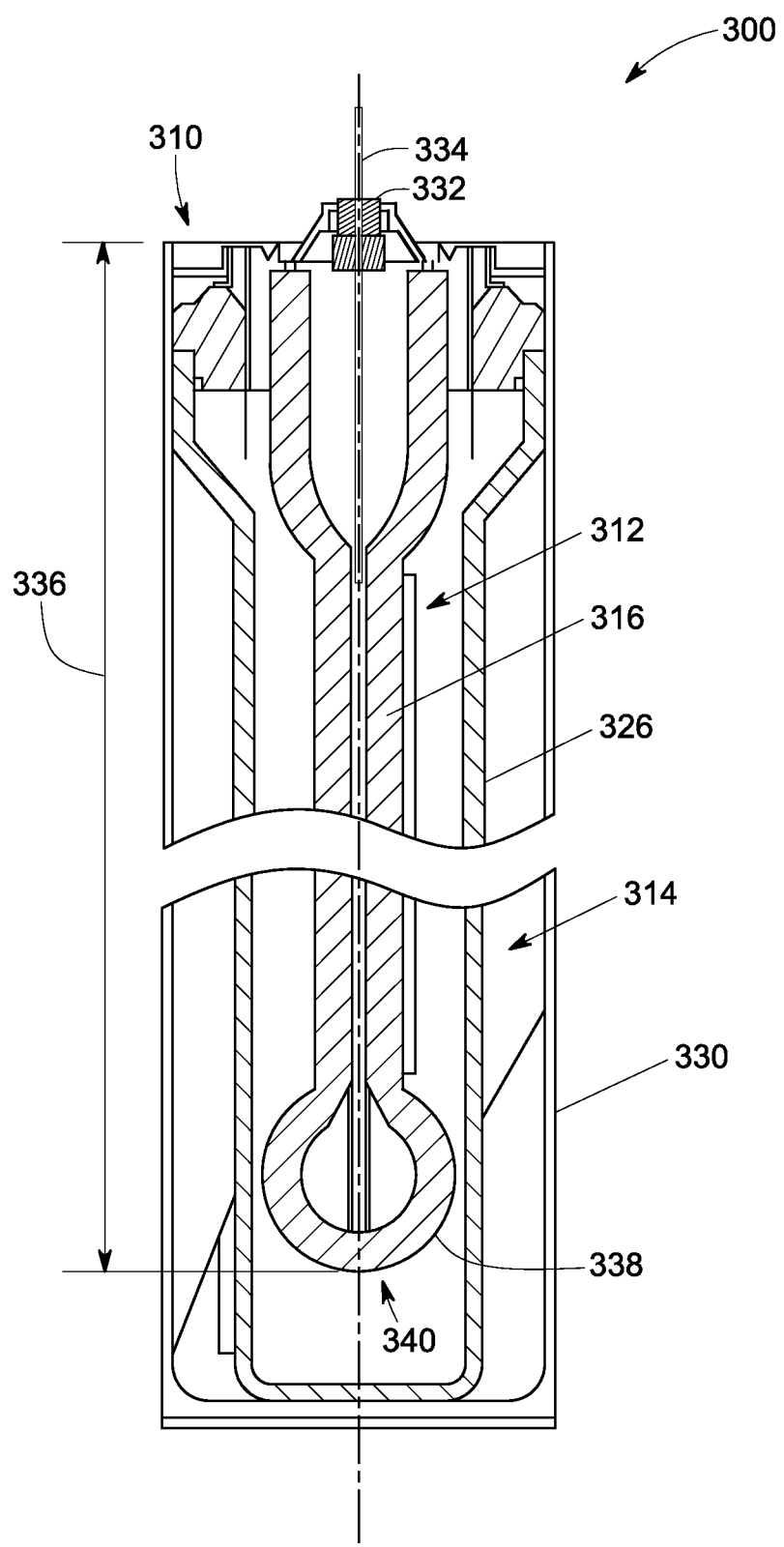
FIG. 3 is a schematic view illustrating a front cross-sectional view of a SoC electrochemical cell in accordance with an embodiment of the invention.

Referring to FIG. 3, a cross sectional view 300 of the SoC electrochemical cell 310, for example a sodium-sodium cell is provided. The SoC electrochemical cell 310 assembly includes an outer steel case 330, an anode compartment 314, and a separator 326, sealed using welds, glass seals, and thermo-compression bonds (not numbered in figure). A roughly 0.5 inch diameter opening was left at the top of the assembly for fixing the cathode compartment 312 with the cathode current collector 316 and filling the cathodic material (not shown in figure), for example sodium, and finally welding a closure cap 332 over the opening to seal the cathode compartment 312. A contact device 334, in one embodiment, comprising a continuous SoC measuring contact device 400 shown in FIG. 4 or a binary SoC measuring contact device 500 shown in FIG. 5 was integrated into the closure cap 332. In one embodiment, as shown in the FIG. 3, the continuous SoC measuring contact device 400 is shown integrated with closure cap 332.

Figure 4:
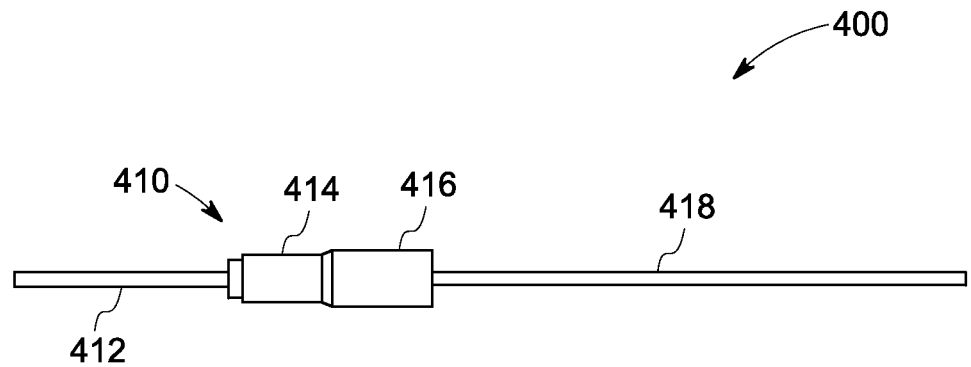
FIG. 4 is a schematic view illustrating a contact device in accordance with an embodiment of the invention.

Referring to FIG. 4, a continuous SoC measuring contact device 400 is shown. The continuous SoC measuring contact device 400 comprises a feed-through-closure cap assembly 410 including an external contact device lead 412, a feed-through portion 414, a metal collar 416, and an internal contact device lead 418. In one embodiment, the external contact device lead 412 and the internal contact device lead 418 seen in the figure are the externally visible parts of the same metal wire that is passed through the feed-through portion 414. In one embodiment, the external contact device lead 412 is welded to the internal contact device lead 418. The continuous SoC measuring contact device 400 is fixed in the electrochemical cell through the closure cap 332 shown in FIG. 3. In one embodiment, the metal collar 414 is placed through the closure cap 332 and is welded to the closure cap. In one embodiment, the metal collar 414 forms the closure cap 332 when placed in the SoC electrochemical cell 310 shown in FIG. 3. In one embodiment, the feed-through closure-cap assembly 410 forming the continuous SoC measuring contact device 400 includes a standard ML/3G cell closure cap 332 with a 0.175 inch hole drilled through the center through which the feed-through closure-cap assembly 410 is disposed inside the cathode compartment 312 of the SoC electrochemical cell 300. In one embodiment, the feed-through portion comprises ceramic and the metal collar comprises nickel. The feed-through closure-cap assembly 410 manufactured by Solid state Sealing is fit into the closure cap 332 and welded into place. When the closure cap 332 is electrically connected to the cathode current collector 316, the portion of the metal wire functioning as the internal contact device lead 418, going through the center of the feed-through portion 414 is insulated from contact with the cathode compartment 312 by the ceramic part of the feed-through portion 414.

Figure 5:
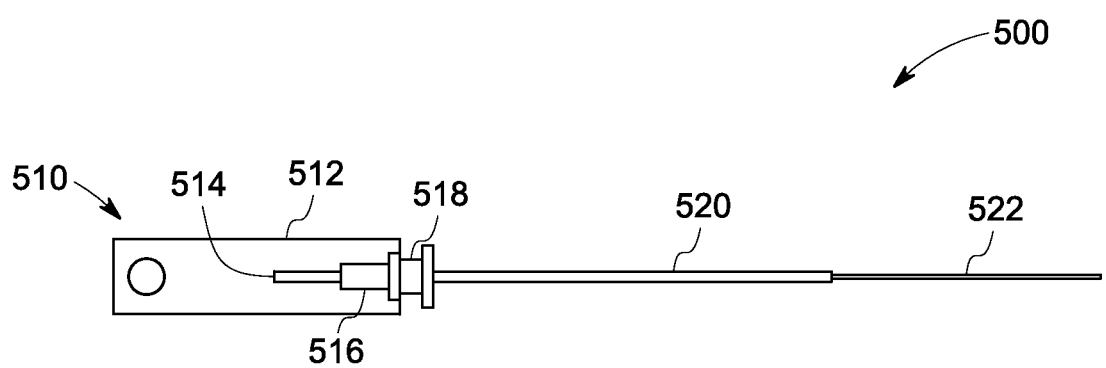
FIG. 5 is a schematic view illustrating a contact device in accordance with an embodiment of the invention.

Referring to FIG. 5, a binary SoC measuring contact device 500 is shown. The binary SoC measuring contact device 500 comprises a feed-through-closure cap assembly 510 including an external cathode lead 512, an external contact device lead 514, a feed-through portion 516, a metal collar 518, an alumina thermocouple sheath 520 and an internal contact device lead 522. The external contact device lead 514 and the internal contact device lead 522 seen in the figure, in one embodiment, are the externally visible parts of a single metal wire that is passed through the feed-through-closure cap assembly 510. In another embodiment, the external contact device lead 514 is an additional metal wire welded to a metal wire forming the internal contact device lead 522. The binary SoC measuring contact device 500 is fixed in the electrochemical cell through the closure cap 332 in the SoC electrochemical cell 310. In one embodiment, the metal collar 518 is placed through the closure cap 332 and is welded to the closure cap. In one embodiment, the metal collar 518 forms the closure cap 332 when placed in the SoC electrochemical cell 310. In one embodiment, the feed-through closure-cap assembly 510 forming the binary SoC measuring contact device 500 includes a standard cell closure cap 332 with a 0.175 inch hole drilled through the center through which the feed-through closure-cap assembly 510 is disposed inside the cathode compartment 312 of the SoC electrochemical cell 300. In one embodiment, the feed-through portion 516 comprises ceramic and the metal collar 518 comprises nickel. A ceramic-metal feed through assembly 510 manufactured by Solid state Sealing may be directly fit into the closure cap 332 and welded into place. When the closure cap 332 is electrically connected to the cathode current collector 316, the internal contact device lead 522, going through the center of the feed-through portion 516 is insulated from contact with the cathode compartment 312 by the ceramic part of the feed-through portion 516. In addition to welding the feed-through closure-cap assembly 510 in its position, an external cathode lead 512 may be welded to the closure cap 332 for passing current through the cathode current collector 316 to the cathode compartment 312. In one embodiment, the length of the metal wire forming the internal contact device lead 522 passing through the feed-through portion 516 is about 12 centimeters down from the closure cap 332. To insulate the top portion of the internal contact device lead 522 from the closure cap 332 because of the sodium vapor bridging in the cell, an alumina thermocouple sheath 520 is placed on the top 8 centimeter of the internal contact device lead 522, and held into place by a small bead of nickel on the internal contact device lead 522.

Referring again to FIG. 3, the cathode compartment 312 comprising the cathodic material (not shown in figure) is located inside the separator 326. The cathodic material mainly consists of metal electrolyte, say for example sodium in the ground state. In one embodiment, when the cell is constructed and no potential is applied across the cathode current collector and the anode current collector of the SoC electrochemical cell 310 the metal is in a solid state. In one embodiment, as the cell is heated, say during the working of the cell, wherein the working temperature of the cell is about 300 degrees Celsius, the solid metal, for example sodium, in the cathode compartment 312 melts. As described herein, when the SoC electrochemical cell 310 reaches an intermittent ground state during the working of the cell the metal in the cathode compartment 312 is in a liquid state. The cathode compartment 312 also includes a U-shaped cathode current collector 316 connected to the cathode compartment 312. In one embodiment, the cathode current collector 316 is made of either pure nickel or nickel with a copper core, which runs down the length 336 of the SoC electrochemical cell 310 with a bend 338 at the bottom 340 of the SoC electrochemical cell 310.

The separator 326 employed is similar to the separator 126 discussed above for the source electrochemical cell 110. In one embodiment, the anode compartment 314 is empty in the ground state of the SoC electrochemical cell 310 as manufactured. The anode compartment 314 fills up with the anodic material, say for example, sodium during the working of the cell based on the reactions discussed below. As used herein the phrase "anode compartment 314 fills up with the anodic material" or, "the anode compartment is empty in the ground state of the electrochemical cell and is filled with metal from reduced metal ions that move from the cathode compartment to the anode compartment through the separator during the working of the cell" means that the sodium is generated in the anode compartment during the working of the cell. The term "filled in" or "fills up" does not imply that the anode compartment is completely filled up to full capacity with the anodic material. As known to one skilled in the art some amount of head space essential for the working of the electrochemical cell remains in the anode compartment after the cathodic material from the cathode compartment moves into the anode compartment to form the anodic material. The amount of cathodic material employed is such that some amount of head space remains in the cathode compartment. So when the cathodic material moves into the anode compartment through the separator and generates the anodic material, a similar head space remains in the anode compartment.

In one embodiment, a chemical reaction $M \rightarrow M^+ + e^-$ occurs in both the cathode compartment and the anode compartment during the working of the SoC electrochemical cell. In one embodiment, the separator allows only movement of the $M^+$ ions between the cathode compartment and the anode compartment. A brief description of the chemistry occurring in the cathode compartment 312 and the anode compartment 314 of a SoC electrochemical cell 310 where the metal used is sodium is included below.

For example, in a sodium-sodium cell, the two half-cell reactions are the same as shown in Equation 4.

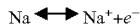 Equation 4

During the charging of the cell the solid metal sodium in the cathode compartment 312 melts to form molten sodium. The molten sodium disassociates into sodium cation and electrons. The sodium cations pass through the separator 326 into the anode compartment 314 where they recombine with the electrons in the anode compartment 314 to reform the metallic sodium. During the discharging a reverse reaction occurs.

In another embodiment, an electrochemical cell is provided. The electrochemical cell comprises a cathode compartment, wherein a metal is disposed in the cathode compartment in a solid form in a ground state of the electrochemical cell, and wherein the metal is in a molten state during working of the cell. The electrochemical cell further comprises a separator and an anode compartment, wherein the anode compartment is empty in the ground state of the electrochemical cell and is filled with the metal from reduced metal ions that move from the cathode compartment to the anode compartment through the separator during the working of the cell. At least one contact device is disposed in the cathode compartment or in the anode compartment, wherein the contact device is suspended from the top of the electrochemical cell in the cathode compartment or in the anode compartment, and wherein the contact device detects the level of the metal in its molten state in the cathode compartment or in the anode compartment during the working of the cell. The electrochemical cell is a SoC electrochemical cell 310.

In still another embodiment, an electrochemical cell is provided. The electrochemical cell comprises, a cathode compartment, wherein a metal is disposed in the cathode compartment in a solid form in a ground state of the electrochemical cell, and wherein the metal is in a molten state during working of the cell. The electrochemical cell further comprises a separator and an anode compartment, wherein the anode compartment is empty in the ground state of the electrochemical cell and is filled with metal from reduced metal ions that move from the cathode compartment to the anode compartment through the separator during the working of the cell. At least one contact device is disposed in the cathode compartment or in the anode compartment, wherein the contact device is suspended from the top of the electrochemical cell in the cathode compartment or in the anode compartment, and wherein the contact device detects the level of the metal in its molten state in the cathode compartment or in the anode compartment during the working of the cell. A cathode current collector is in contact with the cathode compartment and an anode current collector is in contact with the anode compartment. The electrochemical cell further comprises a source for applying a potential across the cathode current collector and the anode current collector of the electrochemical cell. In one embodiment, the metal comprises sodium or potassium. In one embodiment, metal comprises sodium. The electrochemical cell is a SoC electrochemical cell 310.

In one embodiment, the SoC electrochemical cell has a reversible potential of 0 volts. In one embodiment, since both half-cell reactions are the same, the cell has a reversible potential of 0 Volts. In one embodiment, the electrochemical cell has a resistance of less than 0.01 Ohms. In another embodiment, the electrochemical cell has a voltage drop of about 0 Volts under a load.

In one embodiment, when the metal used is sodium, one unique feature of the SoC electrochemical cell 310 is that the sodium-conducting beta-alumina is considered 100 percent efficient separator implying that no electrons pass through the ceramic, nor does any mass pass through the separator other than the sodium cations being oxidized and reduced. The SoC electrochemical cell 310, for example a sodium-sodium cell, works on the basis that the separator is 100 percent efficient, as the amount of sodium in either the cathode compartment or the anode compartment is exactly proportional to the SoC of the source electrochemical cell 110. In one embodiment, with 100 percent efficiency in separation, the error is either minimized or the error does not exist. For, the SoC electrochemical cell described all the current/voltage received by the cell is used for the expected reactions, i.e., the SoC electrochemical cell provides 100 percent coulombic efficiency.

As the SoC electrochemical cell 310 is charged by applying a potential across the cathode current collector 316 and the anode current collector (not shown in figure) and the current flows from the cathode compartment 312 to the anode compartment 314, the sodium level drops in the cathode compartment 312 and the sodium level in the anode compartment 314 rises. When current is reversed, and the SoC electrochemical cell 310 is discharged, the current flows from the anode compartment 314 to the cathode compartment 312, the sodium level drops in the anode compartment 314 and the sodium level in the cathode compartment 312 rises. In one embodiment, the SoC of the source electrochemical cell 110 may be determined by precisely measuring the amount of sodium in the cathode compartment 312 and the anode compartment 314 over time.

In certain embodiments, the sodium may be purified because sodium containing separator 326 may be poisoned by low concentrations of specific impurities, such as for example calcium. These impurities can substitute for sodium ions in the ceramic, and block the conduction of sodium. The separator 326 itself makes a good electrochemical filter. If required, the sodium can be purified by employing methods know to one skilled in the art. In one embodiment, the sodium (Sodium Ingot, 99.8 percent pure, item number 10342, obtained from Alfa Aesar) is purified electrochemically using a modified electrochemical cell, used as a purification cell, in an inert-atmosphere glove box to prevent sodium oxidation or fire. The purification cell may be modified by cutting off the bottom of the cell case, exposing the bottom of the separator on the side of the anode compartment. The cathode compartment is left open without a closure cap. The sodium shavings from the interior of the ingot (minimizing sodium oxide) are loaded into the cathode compartment. The purification cell is then heated to about 300 degrees Celsius where the sodium is molten. Using a power supply connected to the cathode current collector and anode current collector, a positive current is applied. This oxidizes the sodium in the cathode compartment, and it passes through the separator to the anode compartment, where it is reduced back to metallic sodium. As the sodium accumulates, it drips out of the anode compartment into a Pyrex flask for collection of purified sodium.

In one embodiment, the cathode current collector 316 is the standard all-nickel U-shaped cathode current collector 116 shown in FIG. 2, however where the U is bent inwards in the normal sodium-nickel chloride cell i.e., the source electrochemical cell 110, for the SoC electrochemical cell 310 the U is straightened back out. This is simply to leave space in the center of the electrochemical cell 310 for passing the contact device 334 in the embodiment, wherein the contact device 334 is disposed in the cathode current collector 316. In one embodiment, the cathode current collector may comprise other metals that are known to be useful by one skilled in the art. Before the metal is loaded into the SoC electrochemical cell 310, the modified cathode current collector 316 is welded into the cathode compartment 312. The SoC electrochemical cell 310 is then sealed in an inert-atmosphere glove box. For loading of the pure sodium, a large nickel funnel is used. The cathode compartment 312 is filled through a 0.25 inch opening in the cathode current collector 316 that is tapped to fit a funnel (not shown in figure), which screws into the opening. When the metal used is sodium, the SoC electrochemical cell 310 is placed in an aluminum block heater, and heated to 200 degrees Celsius (sodium melts at 100 degrees Celsius). The funnel, for example, a nickel funnel, is wrapped with a heating tape and is also heated to 200 degrees Celsius. At the bottom of the funnel, a piece of fine nickel mesh is placed as a crude filter for any sodium oxide formed during cell fabrication. The Pyrex flask containing the pure sodium is then heated up to 200 degrees Celsius, and 80 grams of the molten sodium is poured into the funnel, which quickly drops into the cathode compartment 312. The total height of the cathode compartment 312 is 20.3 centimeters and the total volume is 156.4 cubic centimeters. 80 grams of solid sodium present in the ground state of the cell approximately gives liquid sodium having an initial height of roughly about 11 centimeters from the bottom, or about 9 centimeters from the top of the cell. As described earlier, the cathodic material does not fill up the entire capacity of the cathode compartment and there is some head space left. Accordingly, when the anodic material is generated in the anode compartment, the anodic material is filled in the anode but does not fill up the entire capacity of the anode compartment. The funnel is then removed, and the contact device 334 assembly is fit into place.

As used herein the phrase "working of the cell" means passing a charge through the cathode current collector 316 connected to the cathode compartment and the anode current collector (not shown in FIG. 3) connected to the anode compartment of the SoC electrochemical cell 310, wherein the temperature of the SoC electrochemical cell increases to greater than the melting point of the metal in the cathode compartment resulting in a liquid metal. The liquid metal in the cathode compartment disassociates into the metal cations and electrons as shown in Equation 4, wherein the metal cations moves into the anode compartment through the separator, wherein a reverse chemical reaction occurs and the metal cations recombine with the electrons in the anode compartment to form the liquid metal during the charging of the cell. In a reverse process of passing a charge through the anode compartment of the electrochemical cell, the metal cations in the anode compartment disassociate to form the metal cations and electrons, wherein the metal cations move into the cathode compartment, wherein a reverse chemical reaction occurs and the metal cations recombine with the electrons in the cathode compartment to form the liquid metal during the discharging of the SoC electrochemical cell 310. The charging and discharging of the SoC electrochemical cell 310 completes one cycle during the working of the cell.

In one embodiment, the measurement of the amount of liquid metal during the working of the cell may be carried out using a binary method. The binary SoC measuring contact device 500 discussed above may be used to measure the amount of liquid in the binary method. In one embodiment, the contact device 334 comprises an insulated metal wire having one end of the wire which is disposed in the cathode compartment or in the anode compartment, exposed. Initially during the working of the cell, as discussed above, when the cell is heated the liquid metal may be in contact with the contact device 334. In one embodiment, when the contact device 334 is disposed in the cathode compartment 312, as the cell charges, the level of the liquid metal in the cathode compartment decreases and the exposed tip of the insulated metal wire no longer remains in contact with the liquid metal. When the reverse reaction occurs, i.e., when the cell discharges and when the level of liquid metal in the anode compartment decreases and the level of the liquid metal in the cathode compartment increases, the contact of the liquid metal with the contact device 334 is reestablished.

In another embodiment, the contact device comprises a non-insulated metal wire. In this embodiment the measurement of the amount of sodium may be carried out using a continuous method. The continuous SoC measuring contact device 400 discussed above may be used to measure the amount of liquid in the binary method. The contact device 334 is an electrical lead, and is always in contact with the liquid metal. The wire has a length, radius, and a resistivity and these parameters are used to calculate the wetted length when the resistance of the contact device is measured. The wetted length is calculated by the formula given in Equation 5:

$$\text{Wetted Length} = \text{Total Length} - (\text{Resistance} \times \pi \times (\text{Radius})^2 / \text{Resistivity})$$  Equation 5

Figure 6:
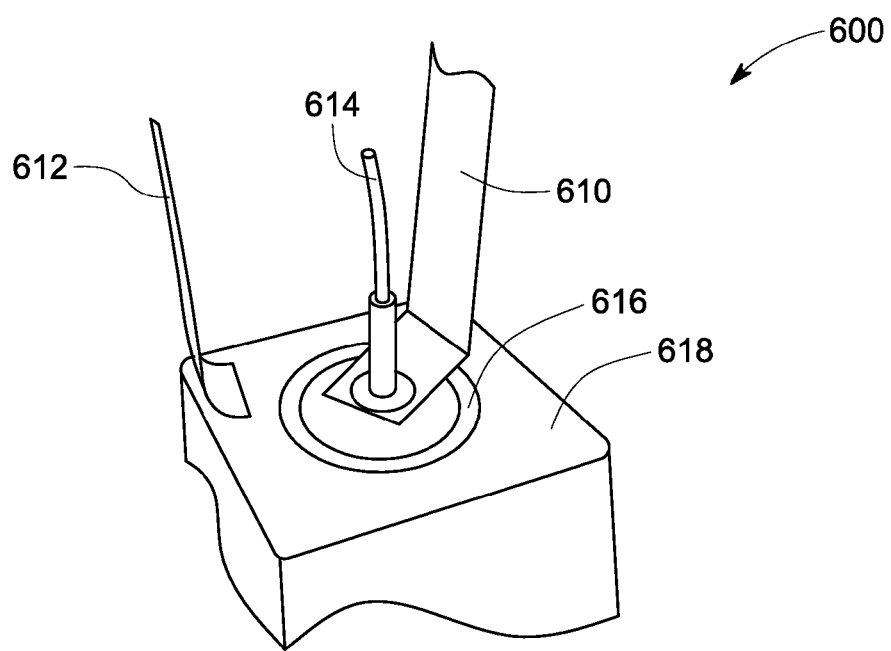
FIG. 6 is a schematic view illustrating a top view of a SoC electrochemical cell in accordance with an embodiment of the invention.

Using an ohmmeter, the resistance between the contact device 334 and the cathode current collector 316 is measured. When the closure cap 332 is placed on the SoC electrochemical cell 310, and the tip of the contact device 334 comes in contact with the liquid metal, the liquid metal shorts the contact device 334 and the cathode current collector 316, and the ohm meter records the resistance. In one embodiment, the resistance is in a range of about 1 milli Ohms to about 1 Ohm, based on the radius of the wire. The continuous SoC measuring contact device 400 is then slowly lifted and the resistance is measured at different positions. When raised approximately 3 centimeter, the contact device is lifted out of the liquid metal, the resistance may instantly become infinite, as the there is no longer a contact between the liquid metal and the contact device 334 and hence there should no longer be a short between the contact device 334 and the cathode current collector 316. The continuous SoC measuring contact device 400 is then manually placed so that the contact device 334 is not directly touching the cathode current collector 316, and the continuous SoC measuring contact device 400 is welded into place to form the contact device 334 and sealing the cathode compartment 312. Referring to FIG. 6, the top view 600 of a finished SoC electrochemical cell 310 is shown. The top view 600 includes an external cathode lead 610 that is connected to the cathode current collector (not shown in figure), an external anode lead 612 that is connected to the anode current collector (not shown in figure), the external contact device lead 614 that is connected to the internal contact device lead (not shown in figure) which is disposed inside the cathode compartment (not shown in figure), the closure cap 616, and the outer steel case 618.

Figure 7:
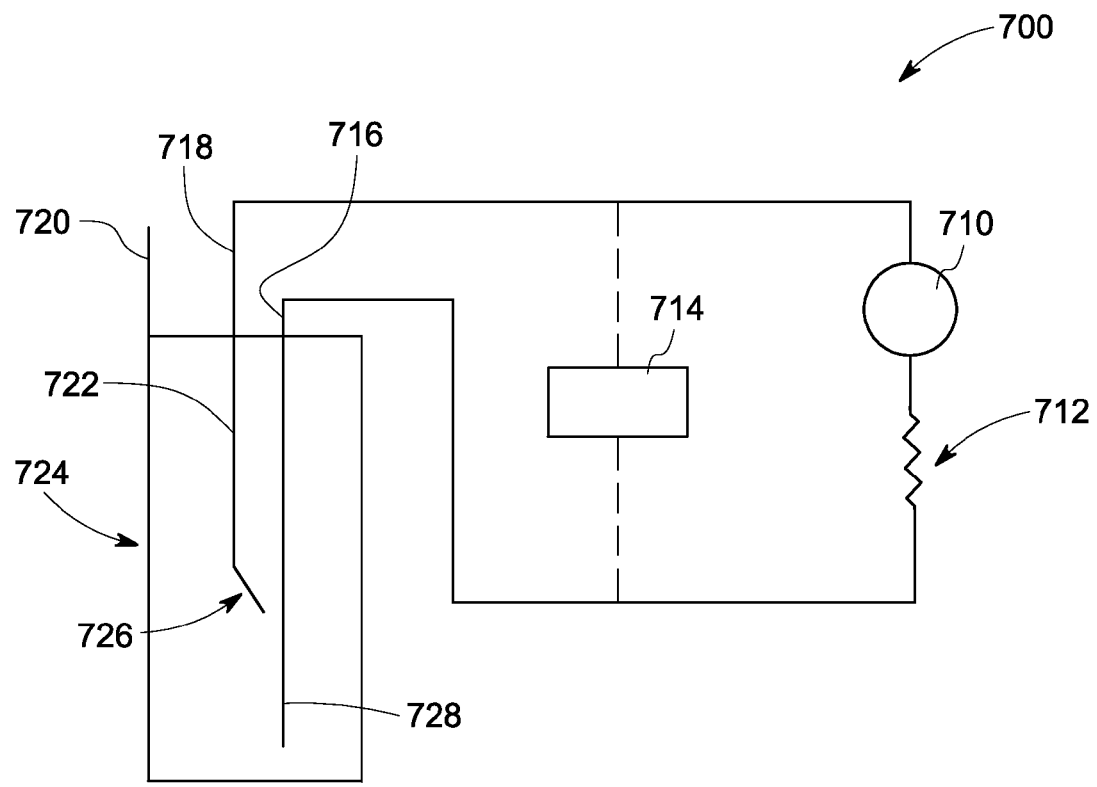
FIG. 7 is a schematic view illustrating a contact device-cathode current collector circuit in accordance with an embodiment of the invention.

In one embodiment, referring to FIG. 7, a contact device circuit 700 is provided, wherein the contact device is disposed in the cathode compartment of the SoC electrochemical cell. To complete the functionality of the SoC electrochemical cell 724, a voltage must be applied between the contact device 722 and the cathode current collector 728. The voltage is applied between an external cathode lead 716 connected to the cathode current collector 728 and the external contact device lead 718 by using a voltage source 710, for example, 2 alkaline batteries, connected in series, for a combined Open Circuit Voltage (OCV) of 3.2 Volts. Because the circuit will be shorted when the sodium is touching both the cathode current collector 728 and contact device 722 (such as when the cell is first built and in its ground state, or when the cell is fully discharged after that), a resistor 712, for example a 6 kilo ohm resistor, is placed in series with the voltage source 710. This keeps the current of the contact device circuit 700 when shorted, low, which will prolong the life of the voltage source 710. In the FIG. 7, the liquid metal level of a SoC electrochemical cell, is represented by a switch 726, which when closed mimics the situation when the sodium level is high mimicking the contact of the sodium with the contact device 722, and when open mimics the situation when the sodium level is low, mimicking the disconnect of the sodium with the contact device 722. When the switch 726 is open, and the circuit 700 is open, there is some voltage drop across the resistor 712, so the voltage read by a voltage measurement device 714 for example voltage sense leads of a BT2000 (Arbin Instruments, Texas), $V_s$, is 2.5 Volts.

For testing the SoC electrochemical cell 310, for example a sodium-sodium cell, the SoC electrochemical cell shown in FIG. 3 is heated to about 330 degrees Celsius in a closed-end square aluminum pipe with four strip heaters mounted on each side (not shown in figure). The top of the SoC electrochemical cell 310, the only exposed side, is insulated with glass-fiber insulation. Testing of the SoC electrochemical cell 310 is performed with a 200 Amps, 10 Volt, 2-channel Arbin BT2000 battery testing system. The SoC electrochemical cell is connected with four cables: positive and negative potential sense and positive and negative current supply. The positive voltage and current cables (not shown in figure) are connected to the external cathode lead 610 shown in FIG. 6. The negative current cable is attached to the external anode lead 612 shown in FIG. 6. The negative voltage cable is attached to the external contact device lead 614, which as discussed above is the contact device feed-through wire that extends outside the cell and is in contact with the internal contact device lead. The actual voltage of the sodium-sodium cell, measured between external cathode lead 610 connected to the cathode current collector and the external anode lead 612 connected to the anode current collector, is not collected by the voltage measurement device 714, as there is only one voltage sense pair. Independent measurement of the cell voltage under load has shown that the resistance of the cell is roughly 0.014 Ohm, so at 50 Amps the cell voltage is roughly 0.7 Volts. The SoC electrochemical cell is cycled under current control protocol with each half-cycle ending when the desired charge/discharge capacity is reached based on the voltage measurement device's built-in ammeter. Charging currents are represented as positive and discharging currents as negative.

The protocol used is based on a standard testing protocol used for a Locomotive Ranking Cycle. Some of the limits in the standard protocol are based on either voltage or resistance of the nickel cells, and these limits were removed or replaced by coulometric limits because the sodium-sodium cell does not have the same voltage and resistance characteristics as the nickel cells.

A simplified summary of the testing protocol employed is shown below:
   a. Charge 44 ampere hours, starting at 80 milliamps and ramp up to 5.5 amperes over time, while the SoS electrochemical cell is at a temperature of 330 degrees Celsius.
   b. Reduce SoS electrochemical cell temperature to 300 degrees Celsius and discharge at −16 amperes for 32 ampere hours.
   c. Charge at 10 amperes for 32 ampere hours.

d. Discharge at 6 amperes for 32 ampere hours.
e. Repeat steps c. and d. ten times.
f. Charge at 32 amperes for 22 ampere hours.
g. Discharge at −32 amperes for 22 ampere hours.
h. Repeat steps f and g, 44 times.
i. Charge at 10 amperes for 32 ampere hours.
j. Discharge at −32 amperes for 32 Ampere hours.
k. Jump back to step f.

To test different operating conditions, from cycle 75 to cycle 95 the current is increased to 100 Amperes on charging and −55 Amperes on discharging. Subsequent cycling is performed at 50 Amperes/−50 Amperes. For cycles 150 through 160, a vibrating table is clamped to the cell heater enclosure, applying a moderate high-frequency vibration to qualitatively simulate vibration on a locomotive.

Figure 8:
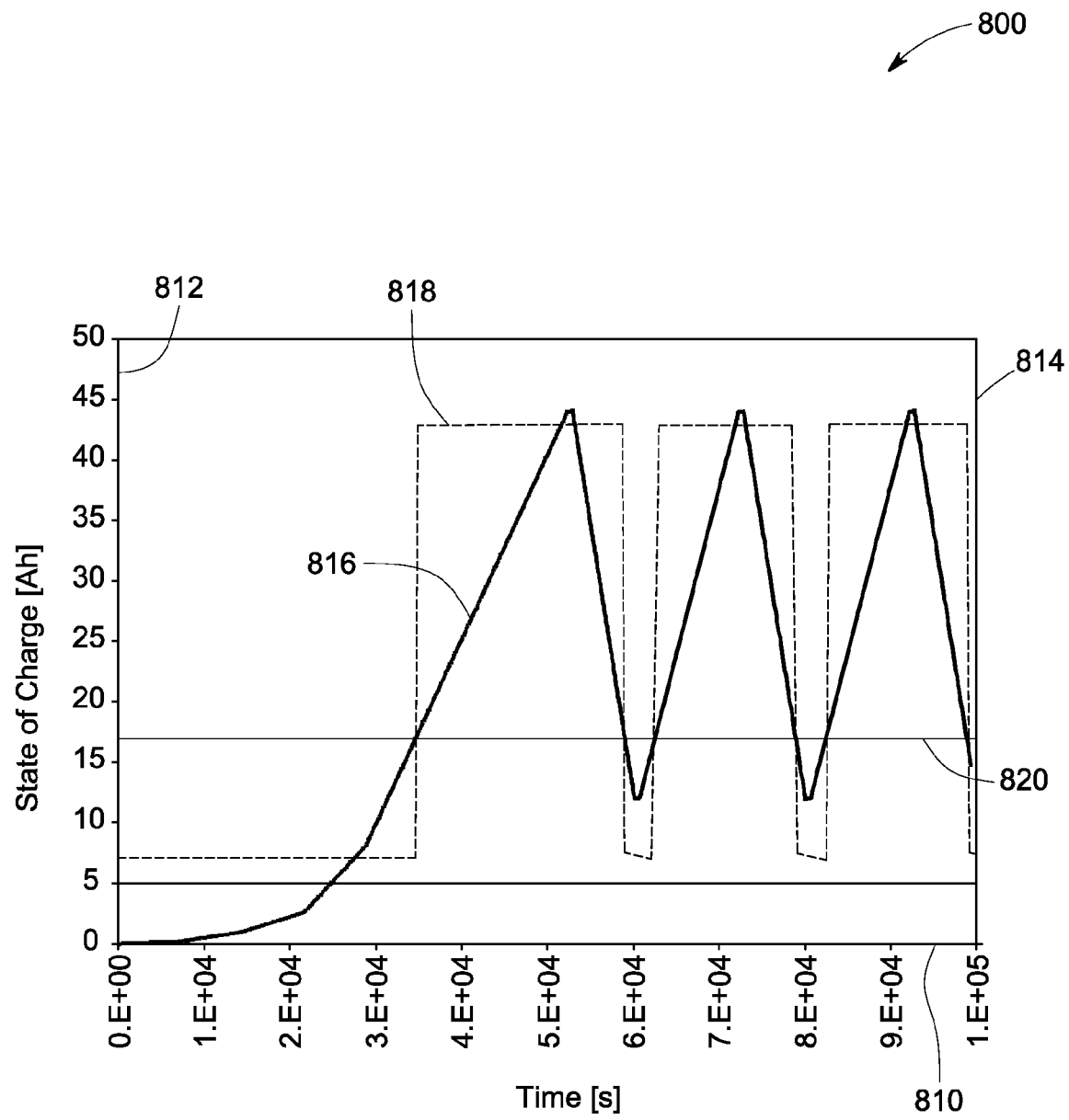
FIG. 8 is a plot of time in seconds versus SoC in ampere hours in accordance with an embodiment of the invention.

Results of the tests are provided below. Initial Performance: Referring to FIG. 8, a plot 800 showing the first three cycles of the SoC electrochemical cell is provided. The plot 800 shows time in seconds on the X-axis 810, the SoC in ampere hours on the Y-axis 812, and the voltage of the contact device also on the Y-axis 814. The plot includes the SoC of the electrochemical cell, shown by the curve 816, as tracked by the ammeter of the voltage measurement device. The voltage output of the contact device is shown by the curve 818. As built, the sodium in the positive compartment is at its highest level, meaning the sensor circuit between the contact device and the cathode current collector is shorted, and the voltage output is close to 0 Volts. At approximately 17 ampere hours, the sodium level is low enough that the contact device is no longer touching the sodium, and the sensor circuit is open, with a voltage of 2.5 Volts from the alkaline battery voltage source. As illustrated by the curve 820, the contact device is switching from 0 to 2.5 Volts and back at the same SoC of 17 ampere hours in the first three cycles.

Figure 9:
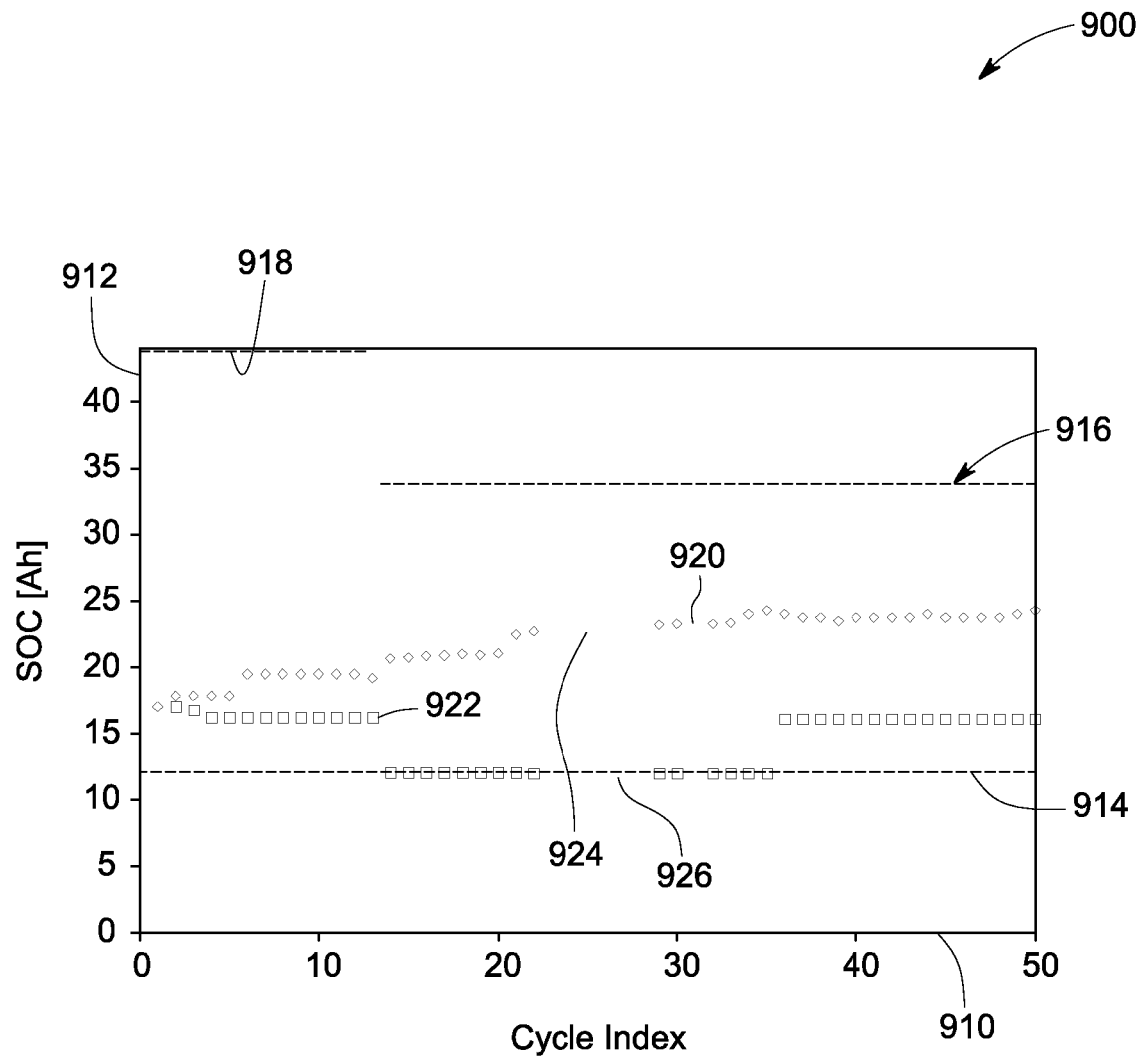
FIG. 9 is a plot of cycle index versus SoC in ampere hours in accordance with an embodiment of the invention.

Contact device conditioning: While the switching in the first three cycles occurred at the same SoC on both charge and discharge, FIG. 9 shows that over the next 50 cycles there was a change in the sensor reading. Referring to FIG. 9, a plot 900 of cycle index (cycle number, subjected to so many cycles) in the X-axis 910, versus SoC in ampere hours on the Y axis 912 is provided. As defined in the protocol, the first 11 cycles are at a lower current (10 Amperes/−16 Amperes) and are 32 Ampere hours. The curves 914, 916 and 918 show the SoC limits of the cycling. Curve 920 represents a charge-switching event and curve 922 represents a discharge-switching event. After cycle 12, the cycles are only 22 Ampere hours, but are at 32 Amperes/−32 Amperes. The plot 900 data collection protocol used for cycles 14 through 34 is flawed, and as a result the SoC of the discharge-switching event is falsely being recorded as the minimum SoC, or 12 Ampere hours as shown in regions 926. For cycles 23 through 28, no data is collected due to the error as shown by the break 928 in curve 920. Despite the data collection issues, there is a clear change in SoC where the contact device responds in the charging direction as shown by curve 920. While the sensor initially responds around 16 to 17 Ampere hours, after 30 cycles the contact device has shifted to 23 to 24 Ampere hours, a significant change as shown by the curve 920. This shift is much too large to be caused by error in the voltage measurement device. In contrast, in the discharge direction, the sensor has very little change (ignoring cycles 14-34), and remains stable around 17 Ampere hours in this testing window as shown by the curve 922. There is a measurable difference between when the contact device measures a response in the charging versus the discharging direction, ideally the response would occur at the same SoC.

Figure 10:
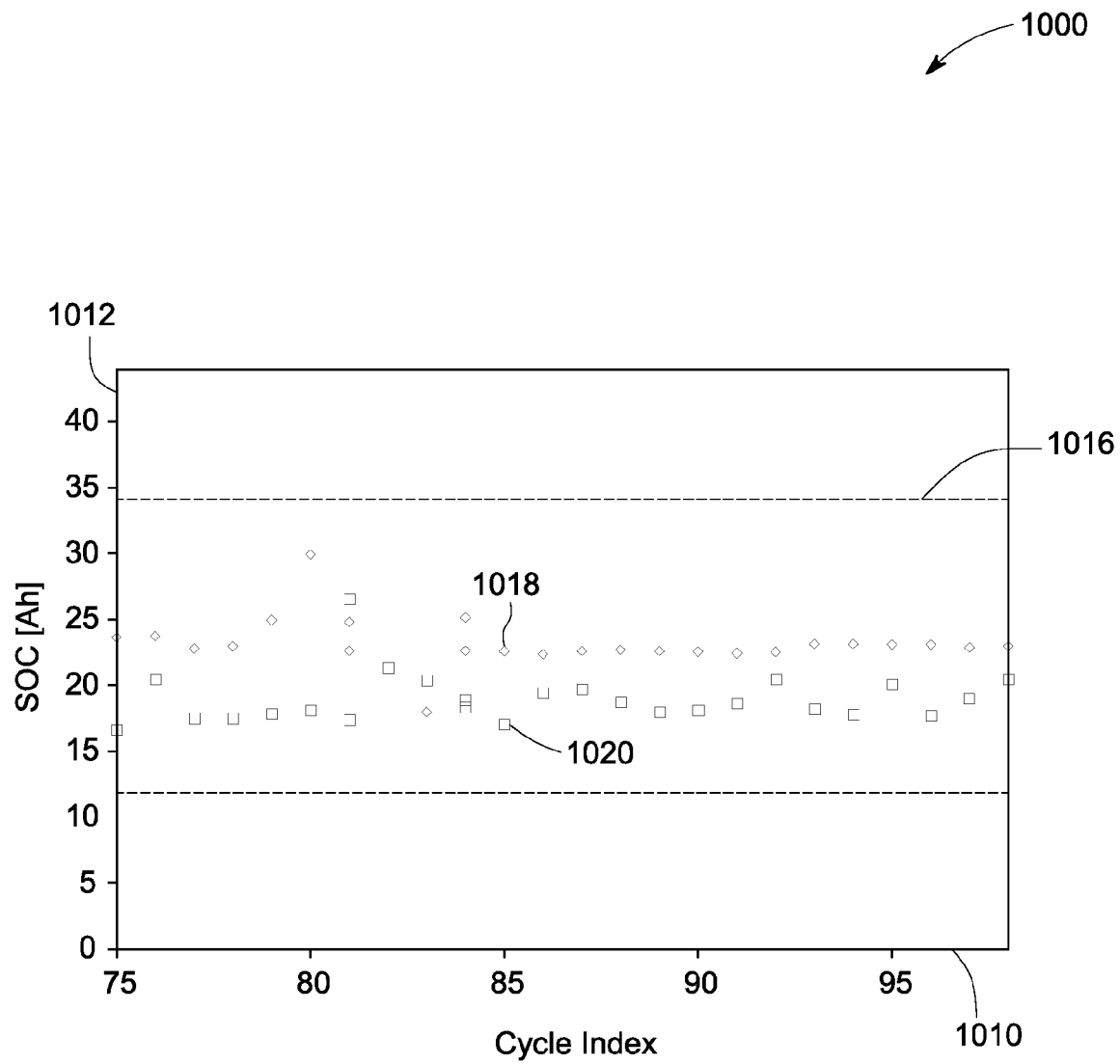
FIG. 10 is a plot of cycle index versus SoC in ampere hours in accordance with an embodiment of the invention.

High Current Cycling: In cycles 75 through 98, the current during the 22 Ampere hours cycling is increased to 100 Amperes/−55 Amperes. Referring to FIG. 10 a plot 1000 of cycle index on the X-axis 1010 versus SOC in amperes hours on the Y-axis 1012, is provided. The curves 1014 and 1016 show the SoC limits of the cycling. The plot 1000 shows a significant noise in sensor output, especially in the discharge-switching direction as shown by the curve 1020. The relatively high charging current causes the noise. The curve 1018 shows the sensor output in the charge-switching direction. After these cycles the current is reduced to 50 Amperes/−50 Amperes, twice as fast as other cycles, 100 may be considered as noise here.

Figure 11:
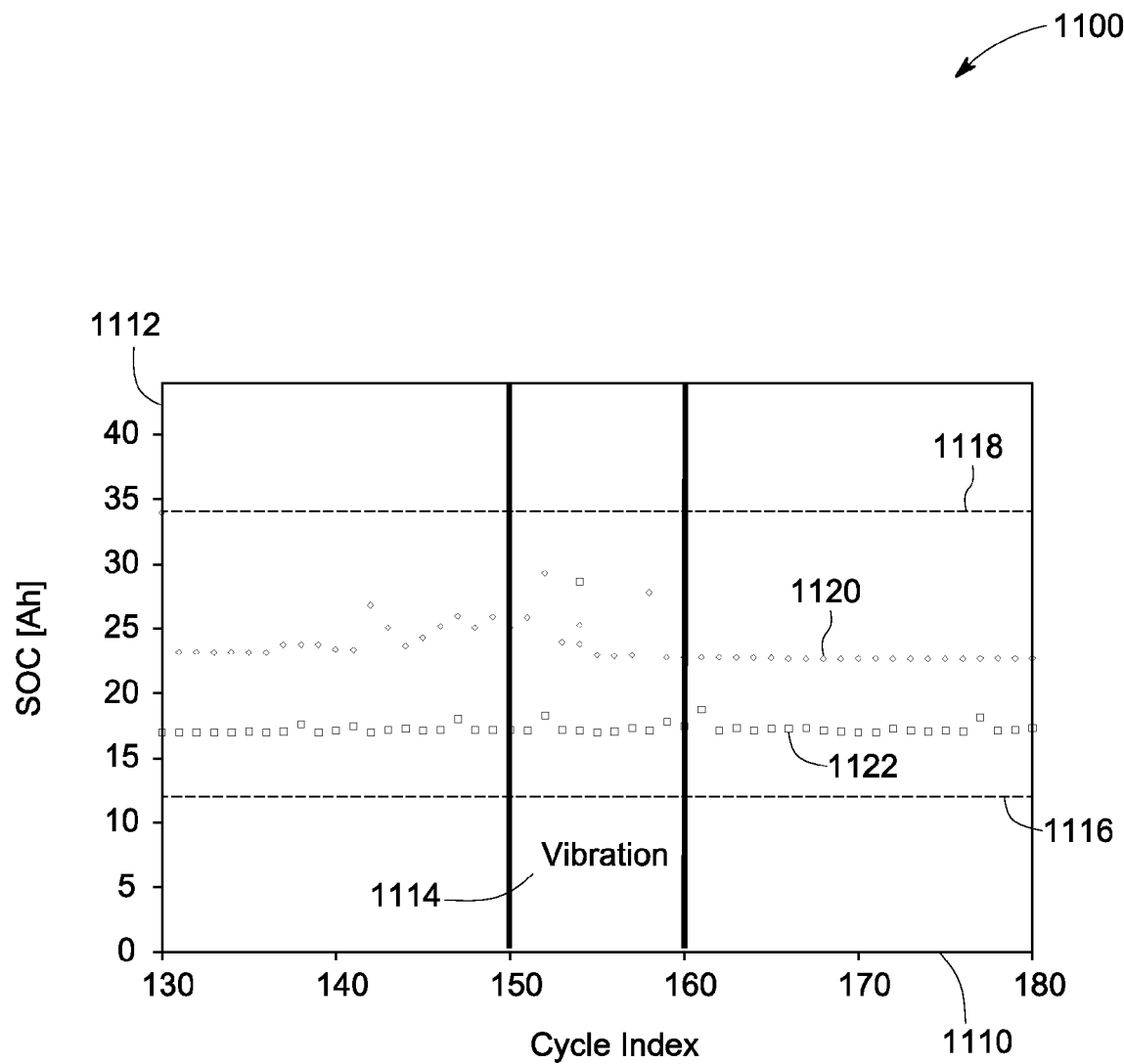
FIG. 11 is a plot of cycle index versus SoC in ampere hours in accordance with an embodiment of the invention.

Vibration testing: Referring to FIG. 11, a plot 1100 provides the result of vibration testing. The plot 1100 provides a measure of cycle index on the X-axis 1110 versus SOC in amperes hours on the Y-axis 1112. The curves 1116 and 1118 show the SoC limits of the cycling. For ten cycles as shown by region 1014, the SoC electrochemical cell 300 is tested under vibration, where the SoC electrochemical cell 300 is vibrated in cycles 150 to 160. The results do not show a significant difference in the SoC on charge direction switching 1120 or discharge direction switching 1122 where the contact device is switching during vibration 1014. After the vibration, however, the SoC of the charge direction switching 1120 appears to be more consistent over time, possibly caused by shaking adhered sodium or sodium oxide particles off of the contact device surface.

Figure 12:
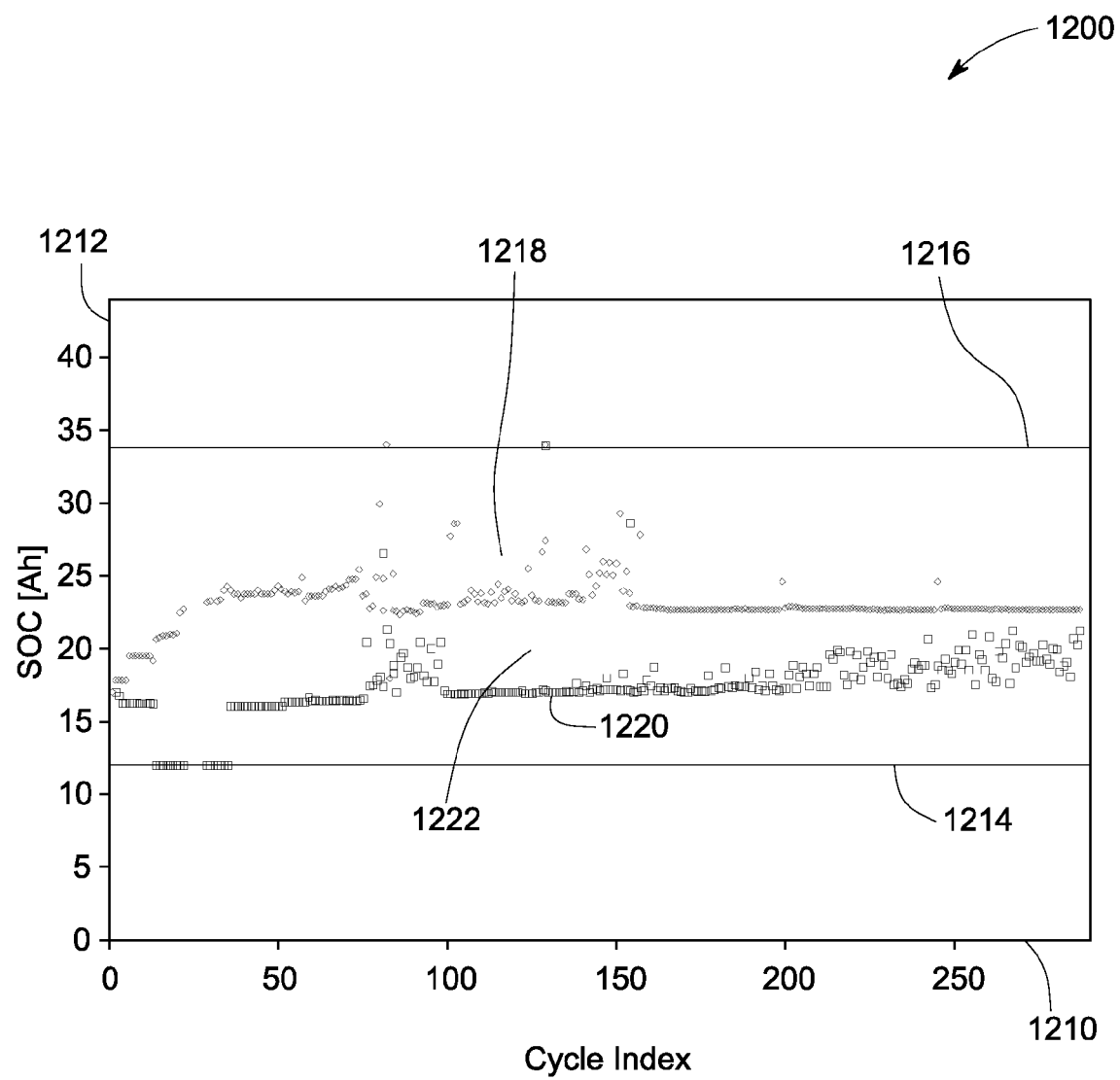
FIG. 12 is a plot of cycle index versus SoC in ampere hours in accordance with an embodiment of the invention.

SoC Drift: Referring to FIG. 12, a plot 1200 showing the drift in SoC is shown. The plot 1200 provides a measure of cycle index on the X-axis 1210 versus SOC in amperes hours on the Y-axis 1212. The curves 1214 and 1216 show the SoC limits of the cycling. The results of roughly 300 cycles are included in FIG. 12. There are several noticeable trends. The first, already mentioned in FIG. 9 illustrating contact device conditioning, is the large change in the SoC of the charge-direction switching represented by curve 1216 early on in cycling. Ignoring the high-current cycling shown in FIG. 10, the SoC of the discharge-direction switching 1220 is very consistent up to cycle 140, while the charge-direction 1218 switching is fairly noisy until cycle 150 (after which the vibration is applied). Interestingly, after cycles 140-150 1222, the charge-direction switching 1218 becomes much less noisy, while the discharge-direction switching 1220 becomes much more noisy.

Figure 13:
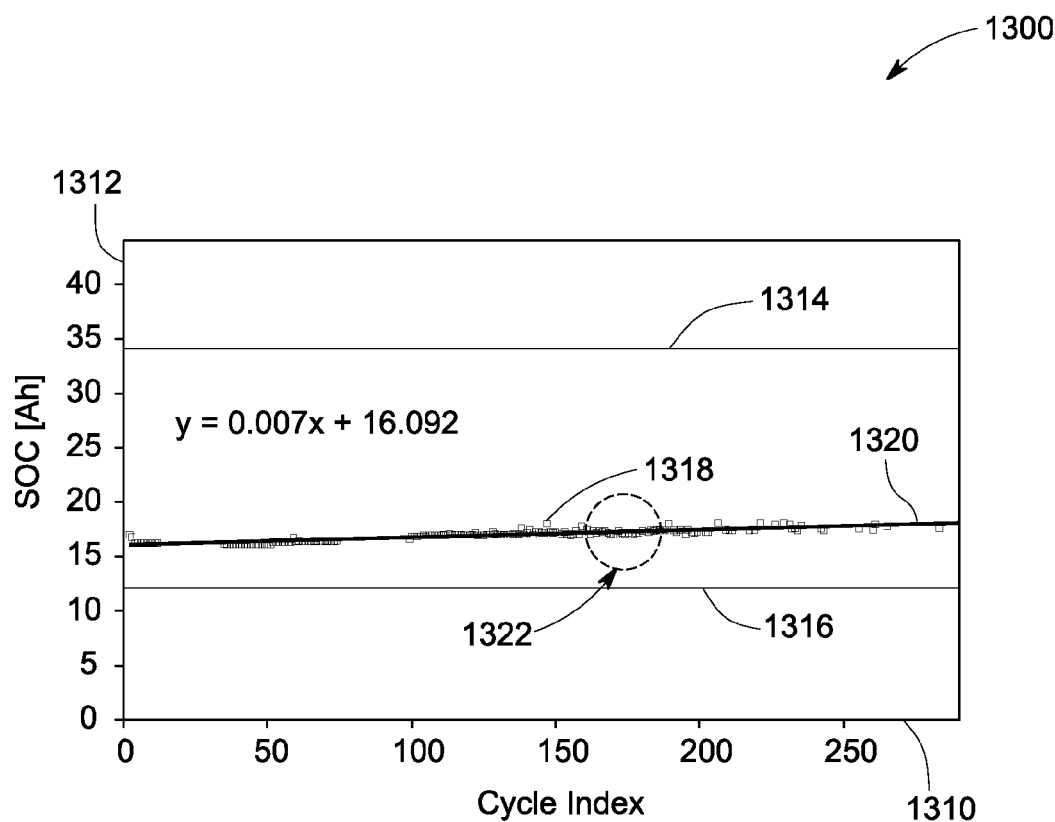
FIG. 13 is a plot of cycle index versus SoC in ampere hours in accordance with an embodiment of the invention.

Focusing on the discharge-switching SoC over time 1318 shown in FIG. 13, there does seem to be a linear trend with cycling. Referring to FIG. 13, a trend is shown by filtering the data; cycles where the data collection is flawed and the high-current cycles are removed. The plot 1300 provides a measure of cycle index on the X-axis 1310 versus SOC in amperes hours on the Y-axis 1312. The curves 1314 and 1316 show the SoC limits of the cycling. The curve 1318 represents the discharge-switching event. Also, when the data becomes noisy, only the local minimum SoC data points are included, and data points at higher SoCs are excluded. Theoretically, the minimums represent when the sodium is rising to the level of the wire. This is supported by the fact that there are no data points much below the trend curve 1320, when the sodium level is higher than the tip of the wire. The resulting fit shows an increase of 0.007 Ampere hours per 22 Ampere hours cycle. If this error reflects the error in the voltage measurement device's electronics, it means that the voltage measurement device is passing slightly less current in the charging direction than the discharging direction, even though based on it's ammeter it is passing exactly the same amount of current in both directions. After the charging data become smooth at cycle 150 1322, there seems to be the opposite trend, where the data points of the SoC is slowly decreasing. This is harder to interpret, considering at the very start of the test the switch occurred around 17 Ampere hours and then quickly changed to 23 to 24 Ampere hours.

Discussion: In the very few first cycles, the SoC sensor appears to work exactly as desired, with the sodium leaving and then touching the sensor wire at the same SoC in both the charging and discharging directions. This quickly changes though, and by cycle 40 there is a gap between the two events of roughly 8 Ampere hours. Based on the cross-sectional area of the separator and the density of sodium, 8 Ampere hours corresponds to almost exactly 1 centimeter of change in sodium height within the positive electrode. This change is likely due to how well the sodium is wetting the nickel wire of the sensor.

Figure 14:
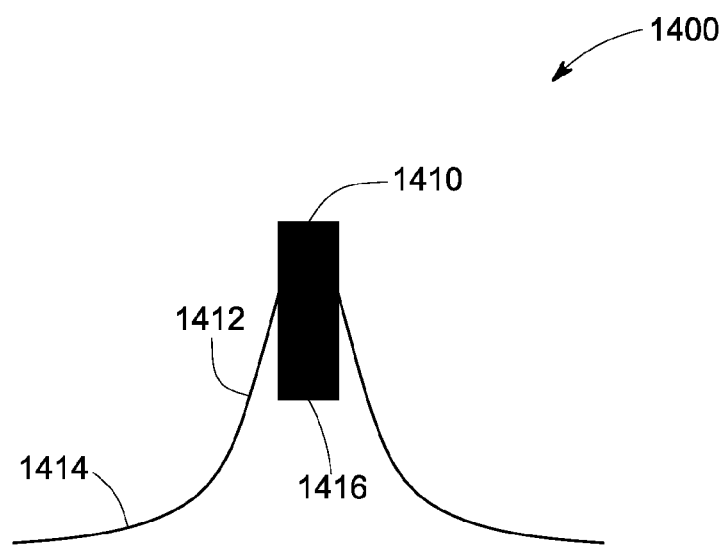
FIG. 14 is a schematic showing the residual metal in contact with the contact device in accordance with an embodiment of the invention.

For example, at first the sodium may not wet the wire efficiently, and in this case when the sodium level drops below the tip of the wire, the sodium immediately loses contact with the wire. Over time or cycling however, the wetting may improve. Once this occurs, the sodium may wet the metal wire even after the general level of sodium has dropped past the tip of the wire to about 1 centimeter below the tip of the wire. Referring to FIG. 14, the wetting of the metal wire over a period of time 1400 is shown. The FIG. 14, shows the metal wire 1410 wetted by the molten sodium 1412, even after the general level of sodium 1414 has dropped past the tip 1416 of the metal wire 1410. While cycling at high current, in this case 100 Amperes charging and −55 Amperes discharging, the sodium rises and falls faster in the cathode compartment. The discharge-switching is stable in the previous 32 Amperes/−32 Amperes cycles, but the SoC of the switching is significantly noisier at the higher currents. It is possible that while the sodium is moving faster some sodium is being left on the sensor wire even after contact to the bulk of the sodium is broken, and this residual sodium 1412 on the tip 1416 of the metal wire 1410 could account for this increase in noise.

In yet still another embodiment, a method of determining the state-of-charge of a source is provided. The method comprises connecting the source in series with a cathode current collector and an anode current collector of an electrochemical cell. The electrochemical cell comprises a cathode compartment, wherein a metal is disposed in the cathode compartment in a solid form in a ground state of the electrochemical cell, and wherein the metal is in a molten state during working of the cell. The electrochemical cell further comprises a separator and an anode compartment, wherein the anode compartment is empty in the ground state of the electrochemical cell and is filled with metal from reduced metal ions that move from the cathode compartment to the anode compartment through the separator during the working of the cell. At least one contact device is disposed in the cathode compartment, wherein the contact device is suspended from the top of the electrochemical cell in the cathode compartment, and wherein the contact device detects the level of the metal in its molten state in the cathode compartment during the working of the cell. The electrochemical cell is the SoC electrochemical cell 310.

In still yet another embodiment, is provided a method for forming an electrochemical cell. The method comprises providing a cathode compartment, wherein a metal is disposed in the cathode compartment in a solid form in a ground state of the electrochemical cell, and wherein the metal is in a molten state during working of the cell; a separator; an anode compartment; wherein the anode compartment is empty in the ground state of the electrochemical cell and is filled with metal from reduced metal ions that move from the cathode compartment to the anode compartment through the separator during the working of the cell; and at least one contact device disposed in the cathode compartment; wherein the contact device is suspended from the top of the electrochemical cell in the cathode compartment, wherein the contact device detects the level of the metal in its molten state during the working of the cell. The electrochemical cell is the SoC electrochemical cell 310.

While the invention has been described in detail in connection with a number of embodiments, the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An electrochemical cell, comprising:
 a cathode compartment comprising a metal in elemental form disposed in the cathode compartment, wherein the metal comprises sodium or potassium;
 a separator;
 an anode compartment; and
 at least one contact device disposed in the cathode compartment or in the anode compartment;
 wherein the contact device is suspended from the top of the electrochemical cell in the cathode compartment or in the anode compartment; and
 wherein the electrochemical cell is in a ground state, and the cell is configured to determine a state-of-charge of a source.

2. The electrochemical cell as defined in claim 1, wherein the source comprises a high-temperature rechargeable electrochemical cell, a potentiostat where the electrochemical cell is used for calibration, or a battery management interface where the electrochemical cell is used for calibration.

3. The electrochemical cell as defined in claim 1, wherein the electrochemical cell has a reversible potential of 0 volts.

4. The electrochemical cell as defined in claim 1, wherein the electrochemical cell has a resistance of less than 0.01 Ohms.

5. The electrochemical cell as defined in claim 1, wherein the electrochemical cell has a voltage drop of about 0 Volts under a load.

6. The electrochemical cell as defined in claim 1, wherein the metal comprises sodium.

7. The electrochemical cell as defined in claim 1, wherein the electrochemical cell functions at a temperature greater than the melting point of the metal.

8. The electrochemical cell as defined in claim 1, wherein the contact device comprises:
 an insulated metal wire having one end of the wire which is disposed inside the cathode compartment or in the anode compartment, exposed.

9. The electrochemical cell as defined in claim 1, wherein the contact device comprises a non-insulated metal wire.

10. An electrochemical cell, comprising:
 a cathode compartment comprising a metal in elemental form, wherein the metal is disposed in the cathode compartment in a solid form in a ground state of the electrochemical cell, and the metal is in a molten state during working of the cell; and wherein the metal comprises sodium or potassium;

a separator;

an anode compartment, wherein the anode compartment is empty in the ground state of the electrochemical cell and is filled with the metal reduced from metal ions that move from the cathode compartment to the anode compartment through the separator during the working of the cell; and at least one contact device disposed in the cathode compartment or in the anode compartment, wherein the contact device is suspended from the top of the electrochemical cell in the cathode compartment or in the anode compartment, and wherein the contact device detects the level of the metal in its molten state in the cathode compartment or in the anode compartment during the working of the cell, wherein the electrochemical cell is configured to determine a state-of-charge of a source.

11. The electrochemical cell as defined in claim 10, wherein a chemical reaction $M \rightarrow M^+ + e^-$ occurs in both the cathode compartment and the anode compartment during the working of the cell.

12. The electrochemical cell as defined in claim 11, wherein the separator allows only movement of the $M^+$ ions between the cathode compartment and the anode compartment.

13. The electrochemical cell as defined in claim 10, wherein the contact device comprises:

an insulated metal wire having one end of the wire which is disposed inside the cathode compartment or in the anode compartment, exposed.

14. The electrochemical cell as defined in claim 13, wherein the exposed end of the metal wire comes in contact with the liquid metal in the cathode compartment when the level of liquid sodium in the cathode compartment or in the anode compartment increases during the working of the cell.

15. The electrochemical cell as defined in claim 13, wherein a state-of-charge is determined based on when the liquid metal is in contact with the exposed end of the insulated metal wire and when the liquid metal is not in contact with the exposed end of the insulated metal wire.

16. The electrochemical cell as defined in claim 10, wherein the contact device comprises a non-insulated metal wire.

17. The electrochemical cell as defined in claim 15, wherein the non-insulated metal wire is always in contact with the liquid metal in the cathode compartment or in the anode compartment and a state-of-charge is calculated based on a change in resistance when the level of liquid sodium in the cathode compartment or in the anode compartment increases or decreases.

18. The electrochemical cell as defined in claim 10, wherein the electrochemical cell has a reversible potential of 0 volts.

19. The electrochemical cell as defined in claim 10, wherein the electrochemical cell has a resistance of less than 0.01 Ohms.

20. The electrochemical cell as defined in claim 10, wherein the electrochemical cell has a voltage drop of about 0 Volts under a load.

21. The electrochemical cell as defined in claim 10, wherein the metal comprises sodium.

22. The electrochemical cell as defined in claim 10, wherein the electrochemical cell functions at a temperature greater than the melting point of the metal.

23. An electrochemical device, comprising:

an electrochemical cell comprising:

a cathode compartment having a metal in elemental form, wherein the metal is disposed in the cathode compartment in a solid form in a ground state of the electrochemical cell, and the metal is in a molten state during working of the cell; and wherein the metal comprises sodium or potassium;

a separator;

an anode compartment, wherein the anode compartment is empty in the ground state of the electrochemical cell and is filled with the metal from reduced metal ions that move from the cathode compartment to the anode compartment through the separator during the working of the cell; and at least one contact device disposed in the cathode compartment or in the anode compartment, wherein the contact device is suspended from the top of the electrochemical cell in the cathode compartment or in the anode compartment, wherein the contact device detects the level of the metal in its molten state in the cathode compartment or in the anode compartment during the working of the cell;

a cathode current collector in contact with the cathode compartment;

an anode current collector in contact with the anode compartment; and a source connected in series with the electrochemical cell.

24. The electrochemical device as defined in claim 23, wherein the source comprises a high-temperature rechargeable electrochemical cell, a potentiostat where the electrochemical cell is used for calibration, or a battery management interface where the electrochemical cell is used for calibration.

25. An electrochemical reference cell connected in series to a source electrochemical cell; and is operable in a ground state to indicate a state-of-charge of the source electrochemical cell, comprising:

a separator that defines an interior volume of the electrochemical cell into a cathode compartment that comprises a metal in elemental form disposed therein; wherein the metal comprises sodium or potassium;

an anode compartment, wherein the anode compartment is empty in the ground state of the electrochemical cell; and a contact device disposed in the cathode compartment or in the anode compartment, and that is capable of communicating a change in its electrical resistance to a controller.

26. A system comprising the electrochemical reference cell connected in series to a source electrochemical cell, as defined in claim 25, wherein the contact device is responsive to a change in contact surface area of an electrolyte by changing its electrical resistance.

27. The electrochemical cell of claim 1, wherein the metal disposed in the cathode compartment in elemental form is an electrochemical metal consisting essentially of sodium, potassium, or a combination of sodium and potassium.

* * * * *